United States Patent
Bleich et al.

(10) Patent No.: US 8,834,272 B2
(45) Date of Patent: Sep. 16, 2014

(54) DYNAMICALLY RECONFIGURABLE JOYSTICK

(71) Applicant: WMS Gaming Inc., Waukegan, IL (US)

(72) Inventors: Charles R. Bleich, Cary, IL (US); Paul M. Lesley, Blue Island, IL (US); Timothy C. Loose, Chicago, IL (US); Scott A. Massing, Lincolnwood, IL (US)

(73) Assignee: WMS Gaming, Inc., Waukegan, IL (US)

( * ) Notice: Subject to any disclaimer, the term of this patent is extended or adjusted under 35 U.S.C. 154(b) by 20 days.

(21) Appl. No.: 13/790,199

(22) Filed: Mar. 8, 2013

(65) Prior Publication Data

US 2014/0094310 A1    Apr. 3, 2014

Related U.S. Application Data

(60) Provisional application No. 61/707,640, filed on Sep. 28, 2012.

(51) Int. Cl.
*A63F 13/02* (2006.01)
*A63F 13/98* (2014.01)

(52) U.S. Cl.
CPC ..................................... *A63F 13/02* (2013.01)
USPC .................... 463/38; 463/30; 463/35; 463/40

(58) Field of Classification Search
USPC .......................................... 463/30, 35, 38, 40
See application file for complete search history.

(56) References Cited

U.S. PATENT DOCUMENTS

| | | |
|---|---|---|
| 4,538,035 A | 8/1985 | Pool |
| 5,610,631 A * | 3/1997 | Bouton et al. ................. 345/161 |
| 5,805,140 A | 9/1998 | Rosenberg et al. |
| 5,841,372 A | 11/1998 | Matsumoto |
| 6,573,885 B1 | 6/2003 | McVicar |
| 6,805,020 B2 | 10/2004 | Onodera |
| 7,594,848 B2 | 9/2009 | Thomas |
| 8,100,030 B2 | 1/2012 | Koschke et al. |
| 8,113,517 B2 | 2/2012 | Canterbury et al. |
| 8,128,477 B2 | 3/2012 | Durham et al. |
| 8,142,291 B2 | 3/2012 | Ryan |
| 8,167,703 B2 | 5/2012 | Gagner et al. |
| 8,182,339 B2 | 5/2012 | Anderson et al. |
| 2006/0040735 A1* | 2/2006 | Baerlocher ..................... 463/26 |
| 2010/0190548 A1 | 7/2010 | Motyl et al. |
| 2010/0240435 A1 | 9/2010 | Gagner et al. |
| 2011/0212766 A1 | 9/2011 | Bowers et al. |
| 2011/0218035 A1 | 9/2011 | Thomas |
| 2012/0115581 A1 | 5/2012 | Englman et al. |

* cited by examiner

*Primary Examiner* — Paul A D'Agostino
*Assistant Examiner* — Brandon Gray
(74) *Attorney, Agent, or Firm* — Nixon Peabody LLP

(57) ABSTRACT

A gaming machine comprises one or more display devices, a configurable joystick, and one or more memory devices. The memory devices store instructions that, when executed by at least one processor, cause the machine to dispose the joystick in a first joystick state during a first game part and, responsive to a trigger, dynamically reconfigure the joystick to a second joystick state for use during a second game part. A method comprises receiving an input to play a game, providing a configurable joystick in a first joystick state, conducting a first game part with the joystick in the first joystick state, dynamically reconfiguring the joystick from the first joystick state to a second joystick state responsive to a trigger, and conducting a second wagering game part with the joystick in the second joystick state.

18 Claims, 13 Drawing Sheets

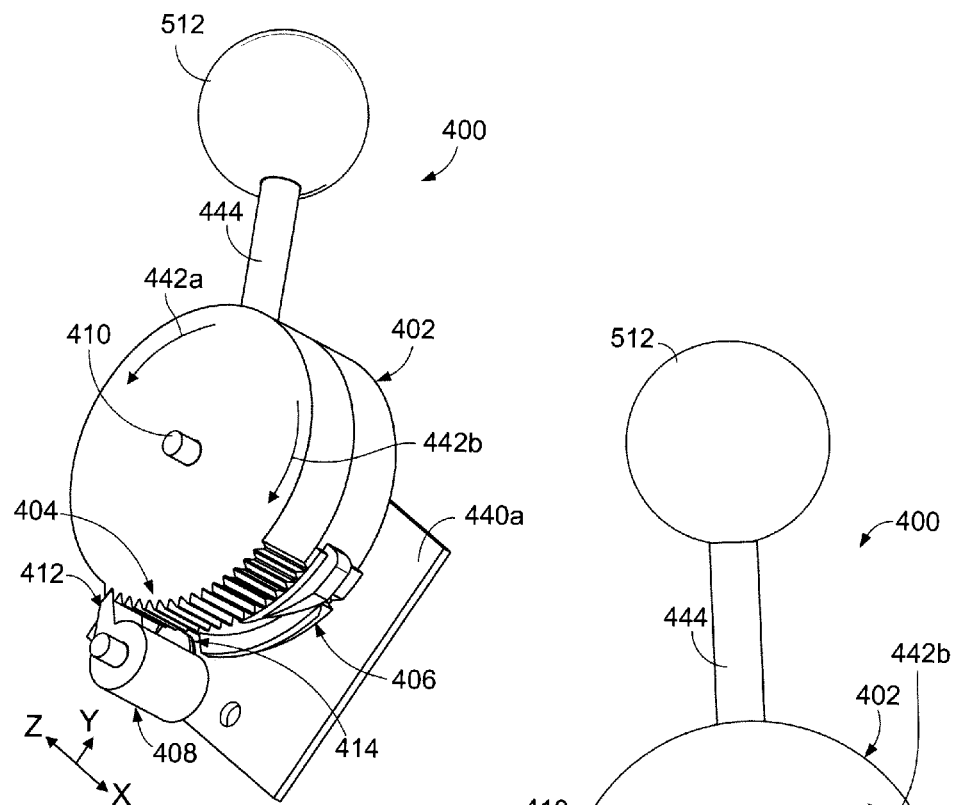
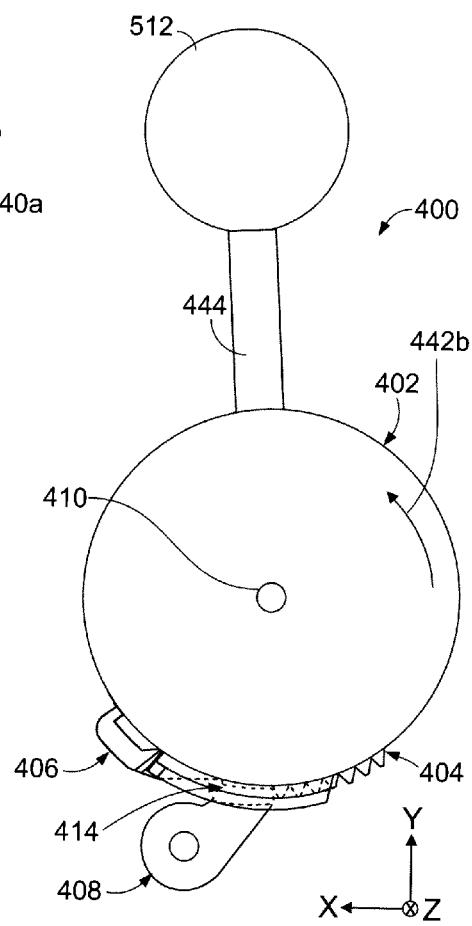
FIG. 4A
FIG. 4B

DYNAMICALLY RECONFIGURABLE JOYSTICK

CROSS-REFERENCE TO RELATED APPLICATIONS

This application claims the benefit of U.S. Provisional Patent Application 61/707,640, filed on Sep. 28, 2012, which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to a dynamically reconfigurable joystick for use with gaming apparatus.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

SUMMARY OF THE INVENTION

According to at least one aspect of the present invention, a gaming system comprises one or more display devices configured to display first and second game parts, a configurable joystick configured to control aspects of the first and second game parts in response to being operated by a player, and one or more memory devices storing instructions. The instructions, when executed by at least one processor, cause the gaming machine to dispose the joystick in a first joystick state during the first game part and, responsive to a trigger, dynamically reconfigure the joystick to a second joystick state for use during the second game part.

According to at least one aspect of the present invention, the first wagering game part comprises a part of at least one of a base wagering game, a bonus game, or a game feature.

According to at least one aspect of the present invention, the second wagering game part comprises a part of at least one of a base wagering game, a bonus game, or a game feature.

According to at least one aspect of the present invention, responsive to a second trigger, the instructions cause the gaming machine to dynamically reconfigure the joystick to a third joystick state for use during a third wagering game part.

According to at least one aspect of the present invention, responsive to a second trigger, the instructions cause the gaming machine to dynamically reconfigure the joystick to the first joystick state.

According to at least one aspect of the present invention, the trigger includes an outcome of a base wagering game.

According to at least one aspect of the present invention, the trigger includes a transition of the wagering game from the first wagering game part to the second wagering game part.

According to at least one aspect of the present invention, the first joystick state comprises at least one of a first home position, use of a ratcheting feature, a first predefined range of movement in one or more axes, a first predefined arc of rotation in one or more axes, use of a plunger feature, and a first joystick height setting.

According to at least one aspect of the present invention, the joystick comprises a shaft and wherein the first joystick state includes positioning the shaft at the first home position and the second joystick state includes positioning the shaft at a second home position.

According to at least one aspect of the present invention, the joystick includes the ratcheting feature and wherein the first joystick state includes use of the ratcheting feature and the second joystick state does not use the ratcheting feature.

According to at least one aspect of the present invention, the joystick comprises a shaft and wherein the first joystick state includes the first predefined arc of rotation of the shaft and the second joystick state includes a second predefined arc of rotation of the shaft, different than the first arc of rotation.

According to at least one aspect of the present invention, the joystick comprises a shaft and wherein the first joystick state includes the first predefined range of movement of the shaft in one or more axes and the second joystick state includes a second predefined range of movement of the shaft in one or more axes, different than the first range of movement.

According to at least one aspect of the present invention, the joystick includes the plunger feature and wherein the first joystick state includes use of the plunger feature and the second joystick state does not include use of the plunger feature.

According to at least one aspect of the present invention, the first joystick state includes the first joystick height setting and the second joystick state includes a second joystick height setting.

According to at least one aspect of the present invention, the joystick includes the shaft configured to move about a pivot point, the shaft comprising a first portion above the pivot point, a first biasing member configured to bias the shaft in a first direction about the pivot point, a second biasing member configured to bias the shaft in a second direction generally opposite the first direction; and at least one positioning mechanism configured to move such that movement of at least one of the at least one positioning mechanisms from a first position to a second position moves the first portion about the pivot point from the first home position to the second home position.

According to at least one aspect of the present invention, one positioning mechanism is configured to move the first biasing member and the second biasing member.

According to at least one aspect of the present invention, the gaming system further comprises a first motor operatively connected to a first of the at least one positioning mechanisms and a second motor operatively connected to a second of the at least one positioning mechanisms.

According to at least one aspect of the present invention, the first motor and the second motor are driven simultaneously.

According to at least one aspect of the present invention, the joystick further comprises at least one encoder to provide positive feedback on the location of the shaft According to at least one aspect of the present invention, the joystick further comprises a position sensing member configured to contact a touchscreen such that the position of the joystick can be determined using the touchscreen.

According to at least one aspect of the present invention, the joystick comprises a ratcheting feature.

According to at least one aspect of the present invention, the joystick comprises an upper plate defining an opening within which movement of the shaft is possible, and an actuator configured to move an actuating member to inhibit movement of the shaft in at least a portion of the opening.

According to at least one aspect of the present invention, the ratcheting feature is a simulated ratcheting mechanism.

According to at least one aspect of the present invention, the gaming system of claim 23, wherein the simulated ratcheting mechanism includes using force feedback.

According to at least one aspect of the present invention, the ratcheting feature is a mechanical ratcheting mechanism.

According to at least one aspect of the present invention, the mechanical ratcheting mechanism includes a rotary actuator having a rotatable body configured to rotate about a first shaft defining an axis of rotation, the rotatable body including a cam and a toothed portion adjacently disposed, a biasing element configured to bias the rotatable body in a first direction about the axis of rotation, a lever-arm disposed on one side of the rotatable body to facilitate movement of the rotatable body in a second direction opposite the first direction, and a pawl biased by a biasing member toward a first state in which the pawl engages the toothed portion to restrict movement of the rotatable body in the first direction. The cam is configured to engage the pawl at a predetermined rotation of the rotary actuator in the second direction and move the pawl from the first state to a second state in which the pawl is disengaged from the teeth until the rotatable body returns to an initial position responsive to the biasing element.

According to at least one aspect of the present invention, the rotatable body comprises a first subpart and a second subpart disposed adjacently to and concentrically with one another.

According to at least one aspect of the present invention, movement of the toothed portion relative to the cam alters the predetermined rotation of the rotary actuator in the second direction from the initial position.

According to at least one aspect of the present invention, the joystick comprises reconfigurable home position.

According to at least one aspect of the present invention, the gaming system further comprises an upper plate defining an opening within which movement of the lever-arm is possible, and an actuator configured to move an actuating member to inhibit movement of the lever-arm in at least a portion of the opening.

According to at least one aspect of the present invention, the joystick further comprises a selectively actuatable locking device configured to, in a locked state, prevent rotation of the rotatable body.

According to at least one aspect of the present invention, the pawl comprises a guide portion; the pawl is disposed for rotational and axial movement along a second shaft substantially parallel to the first shaft; and the cam includes a disengagement feature and a rail, the disengagement feature comprising one or more surfaces configured to engage the guide portion of the pawl at a predetermined first angular rotation of the rotatable body to bias the pawl vertically toward the second state at a predetermined second angular rotation of the rotatable body.

According to at least one aspect of the present invention, the one or more surfaces of the disengagement feature is further configured to urge the pawl laterally along the second shaft and into alignment with the rail.

According to at least one aspect of the present invention, the rail includes one or more surfaces configured to engage one or more surfaces of the pawl and wherein the cam is configured to maintain the pawl in the second state until the rotatable body has returned to the initial position.

According to at least one aspect of the present invention, the first and the second angular rotation of the rotatable body are substantially equal.

According to at least one aspect of the present invention, the guide portion defines a channel.

According to at least one aspect of the present invention, the pawl includes a biasing member to laterally bias the pawl toward the first state.

According to at least one aspect of the present invention, the joystick includes an upper plate defining first openings within which movement of the shaft is possible and a movable lower plate disposed below the upper plate, the movable lower plate defining second openings within which movement of the shaft is constrained to the first arc of rotation when the movable lower plate is in a first position and to the second arc of rotation when the movable lower plate is in a second position, the movable lower plate configured to move at least one axis relative to the upper plate.

According to at least one aspect of the present invention, the moveable lower plate is configured to move along a plurality of axes.

According to at least one aspect of the present invention, the moveable lower plate is configured to rotate.

According to at least one aspect of the present invention, the moveable lower plate is configured to translate.

According to at least one aspect of the present invention, the translation is lateral.

According to at least one aspect of the present invention, the translation is vertical.

According to at least one aspect of the present invention, the first openings are generally circular, the second openings are generally circular, and wherein movement of the lower plate away from the upper plate makes the second arc of rotation less than the first arc of rotation.

According to at least one aspect of the present invention, the second openings define a shape including two intersecting lines, the two intersecting lines defining two axes of shaft movement.

According to at least one aspect of the present invention, movement of the lower plate away from the upper plate makes the second arc of rotation less than the first arc of rotation along the two axes.

According to at least one aspect of the present invention, the shaft includes a flared feature below the lower plate.

According to at least one aspect of the present invention, the joystick includes an upper plate defining an opening within which movement of the shaft in the first range of movement is possible in one or more axes and an actuator configured to move at least one of the upper plate or an actuating member adjacent the shaft to thereby alter movement of the shaft in the opening to the second range of movement.

According to at least one aspect of the present invention, the actuator comprises at least one of a motor and a solenoid.

According to at least one aspect of the present invention, the second range of movement includes fewer axes than the first range of movement.

According to at least one aspect of the present invention, the actuator is configured to move the actuating member and wherein the actuating member comprises a lower plate defining a lower opening within which movement of the shaft is possible, the lower plate disposed below the upper plate.

According to at least one aspect of the present invention, the lower opening includes at least two substantially perpendicular slots.

According to at least one aspect of the present invention, the lower opening includes at least one feature configured to selectively inhibit movement of the shaft in the opening to ranges of motion different than the first range of movement.

According to at least one aspect of the present invention, the at least one feature includes a sloped feature to selectively inhibit movement of the shaft in the opening to ranges of motion different than the first range of movement.

According to at least one aspect of the present invention, the at least one feature includes a stepped feature to progressively inhibit movement of the shaft in the opening to ranges of motion different than the first range of movement.

According to at least one aspect of the present invention, the actuating member includes a stepped feature to progressively inhibit movement of the shaft in the opening to ranges of motion different than the first range of movement.

According to at least one aspect of the present invention, the gaming system further comprising a second actuator configured to move a second actuating member.

According to at least one aspect of the present invention, the gaming system further comprises a ratcheting feature.

According to at least one aspect of the present invention, the gaming system further comprises a reconfigurable home position.

According to at least one aspect of the invention, a method comprises receiving an input to begin a game, providing a configurable joystick in a first joystick state, conducting—using one or more processors—a first game part with the joystick in the first joystick state, dynamically reconfiguring the joystick from the first state to a second state responsive to a trigger, and conducting—using at least one of the one or more processors—a second game part with the joystick in the second joystick state.

According to at least one aspect of the present invention, the first wagering game part comprises a part of at least one of a base wagering game, a bonus game, or a game feature.

According to at least one aspect of the present invention, the second wagering game part comprises a part of at least one of a base wagering game, a bonus game, or a game feature.

According to at least one aspect of the present invention, the method includes, responsive to a second trigger, dynamically reconfiguring the joystick to a third joystick state for use during a third wagering game part.

According to at least one aspect of the present invention, the method includes, responsive to a second trigger, dynamically reconfiguring the joystick to the first joystick state.

According to at least one aspect of the present invention, the trigger includes a transition of a wagering game from the first wagering game part to the second wagering game part.

According to at least one aspect of the present invention, the trigger includes an outcome of a base wagering game.

According to at least one aspect of the present invention, the first joystick state comprises at least one of a first home position, using a ratcheting feature, a first predefined range of movement in one or more axes, a first predefined arc of rotation in one or more axes, using a plunger feature, and a first joystick height setting.

According to at least one aspect of the present invention, the joystick comprises a shaft and wherein the first joystick state includes positioning the shaft at the first home position and the second joystick state includes positioning the shaft at a second home position.

According to at least one aspect of the present invention, the joystick includes the ratcheting feature and wherein the first joystick state includes use of the ratcheting feature and the second joystick state does not include use of the ratcheting feature.

According to at least one aspect of the present invention, the joystick comprises a shaft and wherein the first joystick state includes the first predefined arc of rotation of the shaft and the second joystick state includes a second predefined arc of rotation of the shaft, different than the first arc of rotation.

According to at least one aspect of the present invention, the joystick comprises a shaft and wherein the first joystick state includes the first predefined range of movement of the shaft and the second joystick state includes a second predefined range of movement of the shaft, different than the first range of movement.

According to at least one aspect of the present invention, the joystick includes the plunger feature and wherein the first joystick state includes use of the plunger feature and the second joystick state does not use the plunger feature.

According to at least one aspect of the present invention, the first joystick state includes the first joystick height setting and the second joystick state includes a second joystick height setting.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 4A is a perspective view of a joystick and rotary actuator at an initial position according to an embodiment.

FIG. 4B is a reverse side view of the joystick and rotary actuator of FIG. 4A disposed at a second position.

Figure 1:
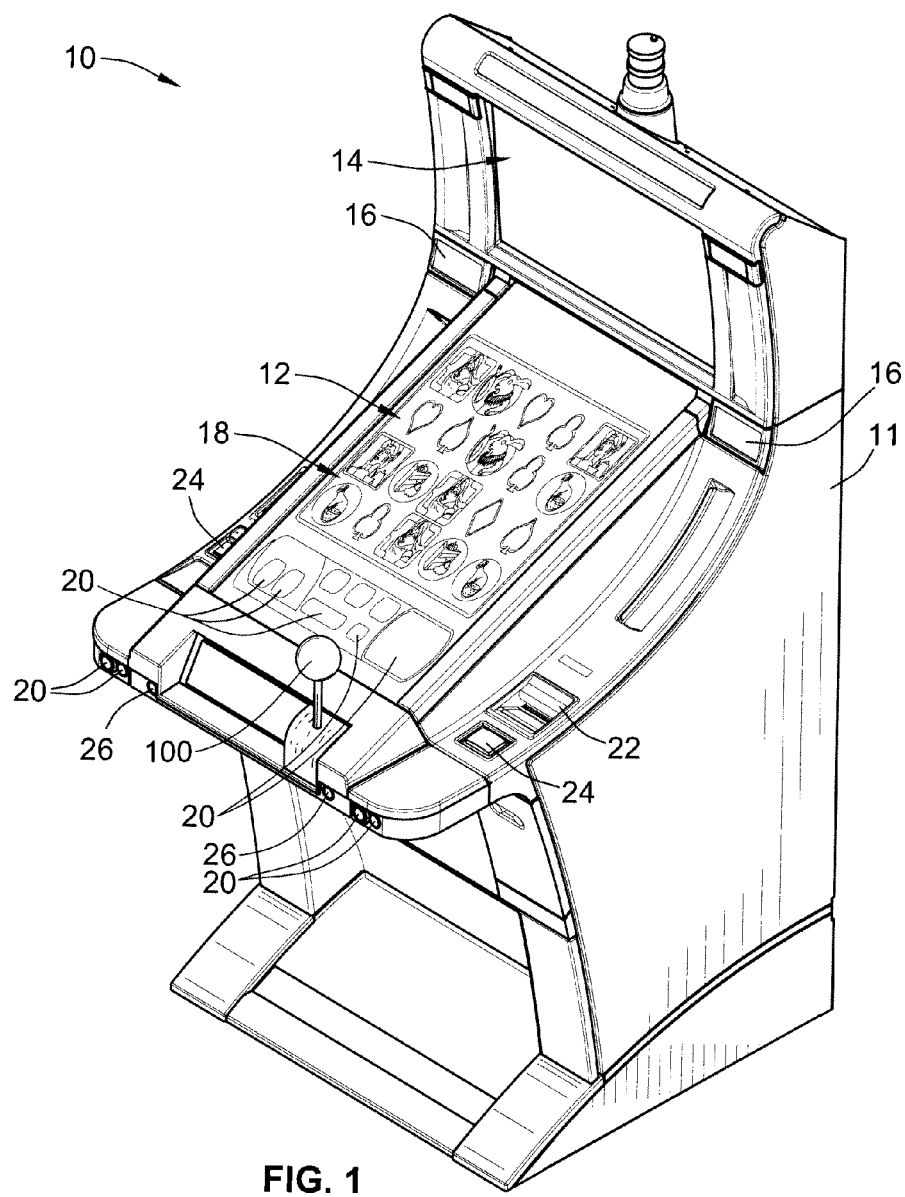
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick 100, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
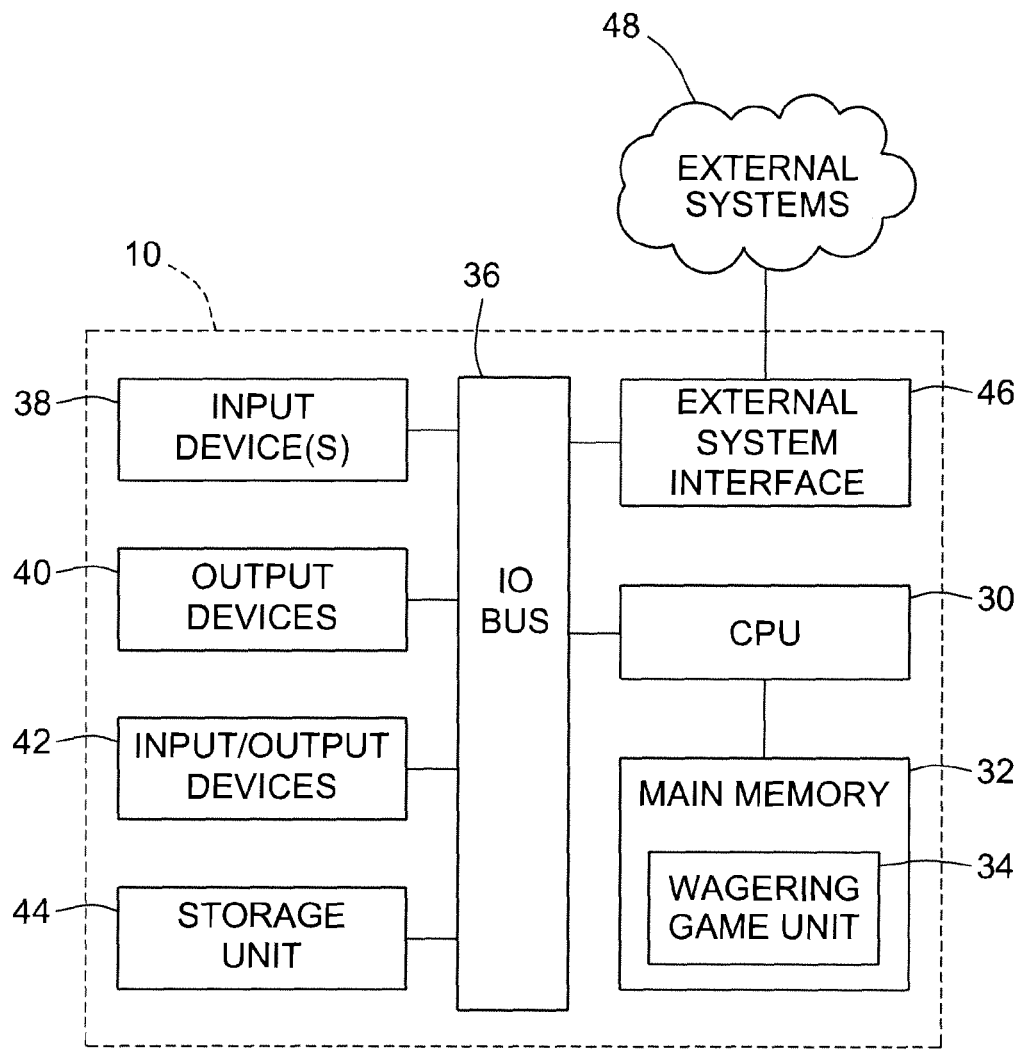
FIG. 2 is a schematic view of a gaming system according to an embodiment of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
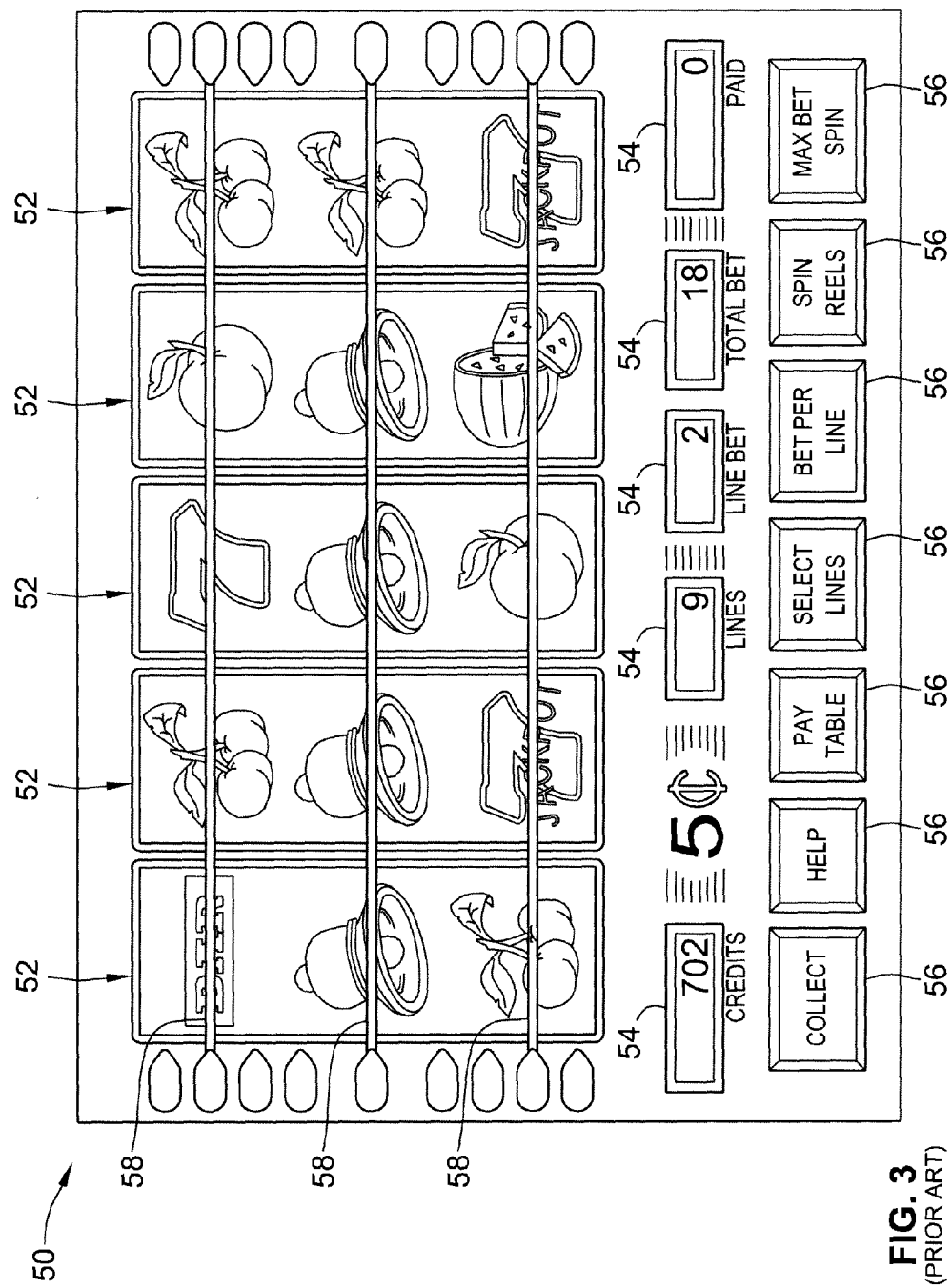
FIG. 3 is an image of an exemplary basic-game screen of a wagering game displayed on a gaming terminal, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Referring back to FIG. 1, the joystick 100 is configurable according to one embodiment. The joystick 100 is configured to control aspects of the wagering game in response to player operation. Aspects of the wagering game that may be controlled are, for example, the direction of movement of a character, the position of a cursor, the direction of a selection, spinning the reels, etc. The aspects controlled by the joystick 100 in a first wagering game part may be different than aspects controlled in a second wagering game part. For example, the player may control the direction of movement of a character in the first wagering game part, but may control the position of a cursor in the second wagering game part. In some embodiments or aspects, the first wagering game part can be a part of a base wagering game, a bonus game, or a game feature. Similarly, in some aspects, the second wagering game part can be a part of a base wagering game, a bonus game, or a game feature. In some aspects, the first and the second wagering game parts may occur within a base wagering game, a bonus game, a game feature, or any combination thereof (e.g., the first wagering game part occurring during the base game and the second wagering game part occurring during the bonus game).

The joystick 100 has a first joystick state and a second joystick state. The first state and the second state can include, for example, a home position, use of a ratcheting feature, a predefined range of movement in one or more axes, a predefined arc of rotation in one or more axes, use of a plunger feature, and/or a joystick height setting. One or more properties of the joystick 100 may change between the first state and the second state. In one nonlimiting example, the first state includes two axes of movement for the player to navigate through adjacent points on a grid and the second state includes 360 degrees of rotation for the player to move a cursor freely on the screen. In another nonlimiting example, the joystick can only move along a single axis with a ratcheting action in the first joystick state, but may move in two axes without the ratcheting action in the second joystick state. Devices that can be used—alone and/or in combination—to accomplish these and other configurations will be described in more detail with reference to FIGS. 4A-10B below. As will also be described in more detail below, the joystick 100 can be dynamically reconfigured from the first state to the second state in response to a trigger. In some aspects, multiple states and/or multiple triggers may be used.

Figure 11:
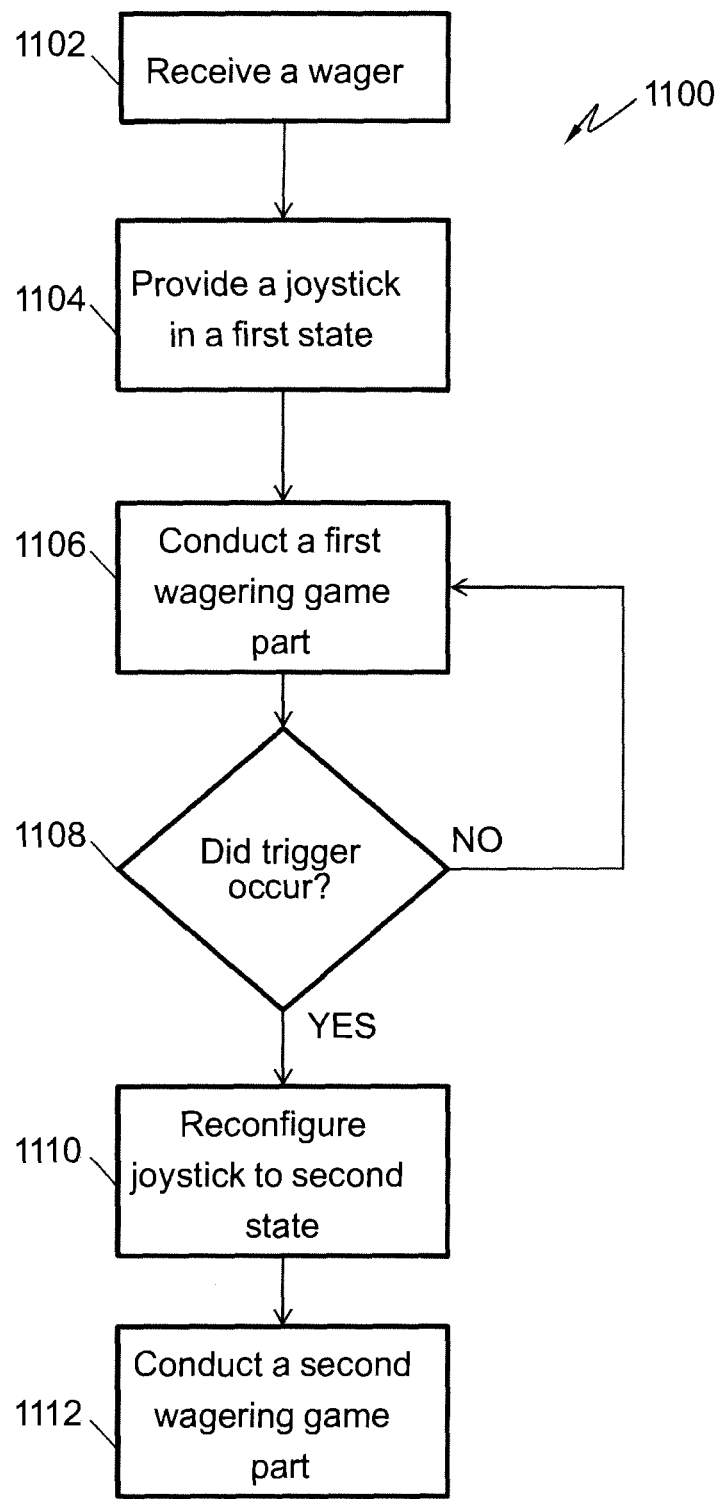
FIG. 11 is a flowchart for an algorithm that corresponds to instructions executed by a controller in accord with at least some aspects of the disclosed concepts.

Referring now to FIG. 11, a flowchart for an algorithm 1100 corresponding to instructions executed by a controller in accord with at least some aspects of the disclosed concepts is shown according to one embodiment. By way of nonlimiting example, a wager is received at step 1102 to begin the algorithm 1100. The wager is placed or otherwise confirmed, for example, using a bill validator 22, coin acceptor, information reader 24, or other input device. A joystick is provided in a first state at step 1104 (e.g., the configurable joystick 100). A first part of a wagering game is conducted at step 1106. Decision box 1108 determines whether a trigger has occurred. Triggers can include, for example, a base game outcome, a bonus game outcome, an occurrence in a game, a predetermined action by a player, a bonus event, a transition from the first wagering game part to a second wagering game part, a transition from a first wagering game to a second wagering game, etc. If the trigger does not occur, the algorithm continues to conduct the first wagering game part in step 1106. If the trigger does occur, the joystick is dynamically reconfigured to the second joystick state at step 1110. The second wagering game part is conducted at step 1112 with the joystick in a second joystick state. In one aspect, a third part of the wagering game is conducted with the joystick in the first state because no trigger has occurred. In other aspects, the joystick is dynamically reconfigured to a third joystick state for use during a fourth game part when a second trigger occurs. In further aspects, the second trigger may occur during any game part or may be limited to certain game parts. In yet further aspects, the loop initiated by decision box 1108 may be omitted in some wagering games conducted on the wagering game machine (e.g., wagering game machines configured to play multiple games).

Referring now to FIG. 4A, a joystick assembly for use as a mechanical input to a gaming machine including a rotary actuator 400 is shown at an initial position according to one embodiment. The rotary actuator 400 includes a rotatable body 402, a lever-arm 444, teeth 404, a cam mechanism 406, and a pawl mechanism 408. The rotatable body 402 and pawl mechanism 408 are rotatably attached to a first plate 440*a* and a second plate 440*b* (shown in FIG. 4E). The first plate 442*a* is opposite the second plate 442*b*. In some aspects, the first and the second plates 440*a,b* may be omitted and that the rotatable body 402 and the pawl mechanism 404 may be attached to other suitable devices.

The rotatable body 402 rotates about a shaft 410 defining an axis of rotation. The rotary actuator 400 also includes a biasing element (not shown) such as one or more springs configured to bias the rotary actuator 400 in a first direction 442*a* about the shaft 410. The lever-arm 444 is attached to the handle 512 and is disposed on one side of the rotatable body 402. The lever-arm 444 and handle 512 can be used to rotate the rotatable body 402 about the shaft 410 in a second direction 442*b*.

The teeth 404 are disposed on another side of the rotatable body 402 and are configured to engage at least a portion of the pawl mechanism 408. The teeth may be disposed adjacent to the lever-arm 444 and/or opposite the lever-arm 444. The teeth 404 are disposed about and extend a distance along the periphery of the rotatable body 402.

The cam mechanism 406 is also located on the rotatable body 402. The cam mechanism 406 is laterally adjacent to the teeth 404 in an axial direction relative to the axis of rotation. The cam mechanism 406 is configured to engage the pawl mechanism 408 at predefined angles of rotation of the rotatable body 402. The cam mechanism 406 may extend the same distance along the periphery of the rotatable body 402 as the teeth 404, a shorter distance than the teeth 404, or a longer distance than the teeth 404.

The pawl mechanism 408 includes a pawl 412 and a guide portion 414. The pawl 412 is configured to engage the teeth 404 and restrict movement of the rotatable body 402 in the first direction 442a. The guide portion 414 is configured to engage the cam mechanism 406. The pawl mechanism 408 is rotatably biased into engagement with the teeth 404. In one embodiment, the pawl mechanism 408 is laterally biased to move from the cam mechanism 406 toward the teeth 404. As will be described in greater detail in connection with FIGS. 4B-4E, the cam mechanism 406 is configured to, at a predetermined rotation of the rotatable body 402 in the second direction 442b, move the pawl mechanism 408 into a second state where the pawl mechanism 408 no longer engages the teeth 404, and maintain the pawl mechanism 402 in the second state until the rotatable body has returned to the initial position.

FIG. 4B shows the joystick and rotary actuator 400 disposed at a second position. In the second position, the handle 512 has been used to rotate the rotatable body 402 about the shaft 410 in the second direction 442b. The pawl mechanism 408 is in the first state with the retention portion (not shown) engaging one of the teeth 404 to prevent the rotatable body 402 from rotating in the first direction 442a. As shown, the guide mechanism 414 has not begun to engage the cam mechanism 406 and is laterally disposed between the cam mechanism 406 and the teeth 404.

Figure 4C:
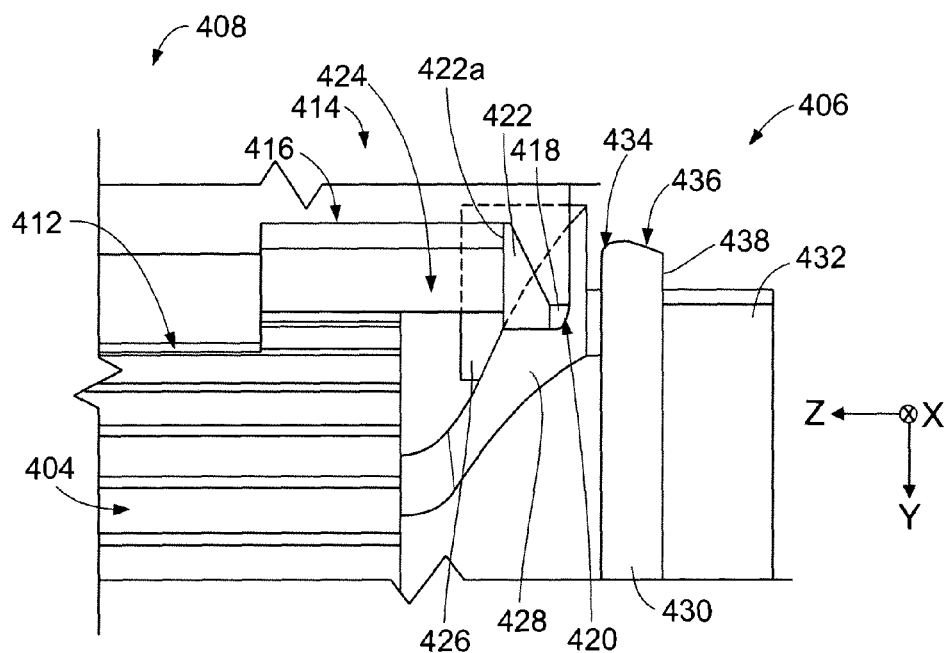
FIG. 4C is an end view of the rotary actuator of FIG. 4A disposed at a third position.

FIG. 4C is an end view of the rotary actuator 400 disposed at a third position with the pawl mechanism 408 transitioning between the first state and the second state. In the third position, the rotatable body 402 has been further rotated in the second direction 442b from the second position. By way of nonlimiting example, the guide portion 414 of the pawl mechanism 408 includes a channel 416, a leading edge 418, and a leading corner 420. In the depicted embodiment, the channel defines a lateral guide surface 422 and a vertical guide surface 424. As shown, the leading edge 418 can be chamfered and generally sloped into the channel 416. The leading corner 420 of the depicted embodiment is generally rounded. The illustrated lateral guide surface 422 extends from the leading edge 418 into the channel 416 and is generally sloped toward the pawl 412.

Also as shown, the cam mechanism 406 includes a disengagement surface 426, a lateral positioning surface 428, a rail 430, and a retention surface 432. The rail 430 includes a rounded inner portion 434, a chamfered face 436, and an outer face 438. The disengagement surface 428 is generally sloped vertically away from the teeth 404. The lateral positioning surface 428 is generally sloped horizontally away from the teeth 404. The retention surface 432 is generally at the same height as the teeth 404.

During the rotation from the second position to the third position, the lateral guide surface 422 contacts the lateral positioning surface 428. The engagement of the lateral guide surface 422 with the lateral positioning surface 428 causes the pawl mechanism 408 to move laterally away from the teeth 404 and toward the cam mechanism 406. Also during the rotation, the vertical guide surface 424 contacts the disengagement surface 426. The engagement of the vertical guide surface 424 with the disengagement surface 426 urges the pawl mechanism 408 vertically away from the teeth 404 such that the pawl 412 no longer contacts the teeth 404.

Figure 4D:
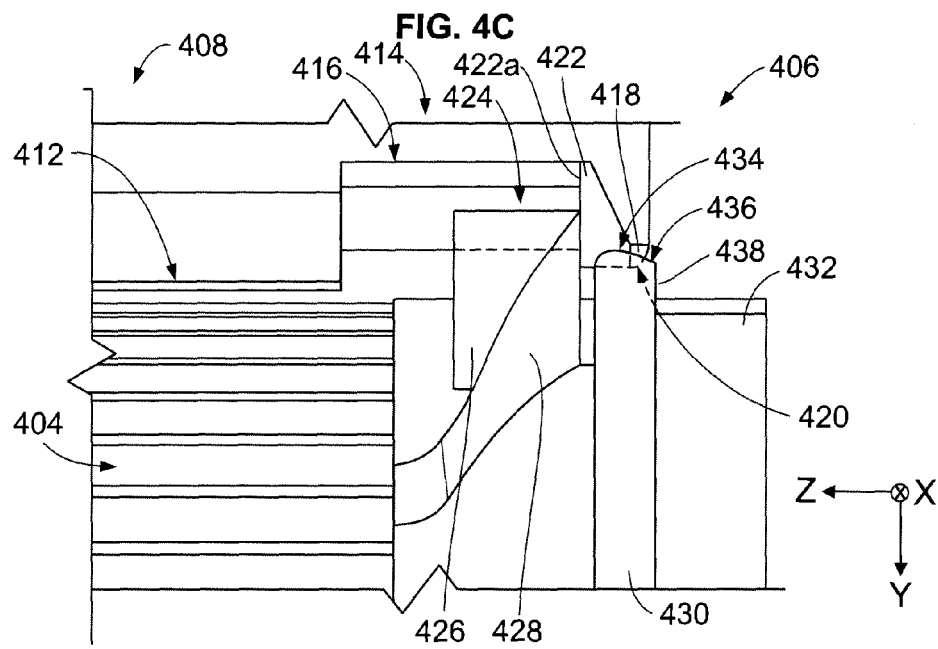
FIG. 4D is an end view of the rotary actuator of FIG. 4A disposed at a fourth position.

FIG. 4D is an end view of the joystick and rotary actuator of FIG. 4A disposed at a fourth position with the pawl mechanism 408 being in the second state. In the second state, the pawl mechanism 408 has been urged vertically such that the pawl 412 cannot engage the teeth 404 and the rotatable body 402 may rotate in both the first direction 442a and the second direction 442b. In the fourth position, the rotatable body 402 has been rotated and the second direction 442b until the leading surface 418 of the pawl mechanism 408 has aligned with the chamfered face 436 of the rail 430. A stop mechanism (not shown) is included to prevent rotation in the second direction 442b at a point after the leading surface 418 aligns with the chamfered face 436.

During the rotation from the third position (FIG. 4C) to the fourth position (FIG. 4D), the disengagement surface 426 and the lateral positioning surface 428 continue to engage the vertical guide surface 424 and the lateral guide surface 422, respectively, in order to move the leading surface 418 into alignment with the chamfered face 436. The leading corner 420 of the pawl mechanism 408 is configured to engage the inner portion 434 of the rail 430 in order to assist the movement of the pawl mechanism 408 to the fourth position. While these interactions may cause the pawl mechanism 408 to move vertically, the pawl 412 will not reach a position that engages the teeth 404. In some aspects, the leading corner 420 and the inner portion 434 may be configured to not interact.

If the handle is released before the pawl mechanism 408 reaches the fourth position, the biasing element will cause the rotatable body 402 to rotate in the first direction 442a. The pawl mechanism 408 will not be properly aligned with the rail 430 and, thus, will be vertically guided by the disengagement surface 426 and laterally guided by the lateral positioning surface 428 toward engagement with the teeth 404. The rotation of the rotatable body 402 in the first direction 442a will continue through the third position (FIG. 4C) until the pawl mechanism 408 has returned to the second position (FIG. 4B). The pawl 412 will rotate downward with the pawl mechanism 408 until the pawl 412 engages one of the teeth 404.

Figure 4E:
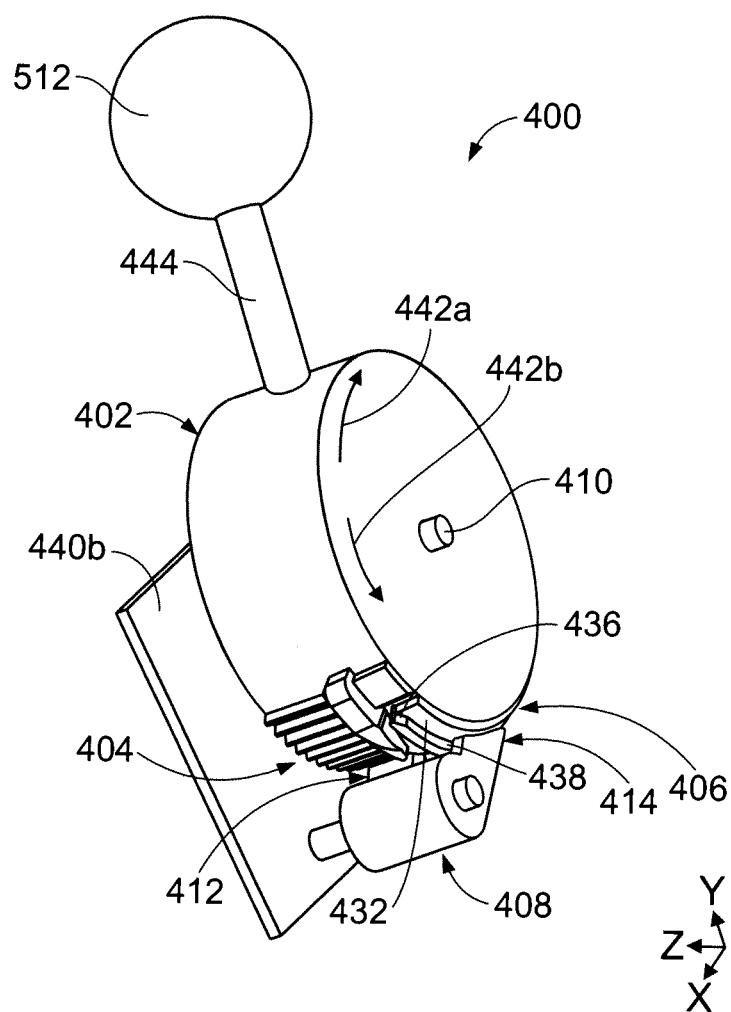
FIG. 4E is a perspective view of the joystick and rotary actuator of FIG. 4A disposed at a fifth position.

FIG. 4E shows the rotary actuator 400 disposed at a fifth position. In the fifth position, the rotatable body 402 has rotated in the second direction 442b about the shaft 410 to the fourth position and then rotated back about the shaft 410 in the first direction 442a. The engagement of the guide portion 414 with the retention surface 432 prevents the pawl 412 from rotating downward into engagement with the teeth 404. This allows the rotatable body 402 to freely rotate in the first direction 442a. The outer face 438 prevents the pawl mechanism 408 from moving laterally toward the teeth 404. The cam mechanism 406 prevents the pawl mechanism 408 from engaging the teeth 404 until the pawl mechanism 408 reaches the initial position.

During the rotation from the fourth position to the fifth position, the leading edge 418 contacts the chamfered face 436 and guides the pawl mechanism 408 laterally away from the teeth 404. As rotation in the first direction 442a continues, the chamfered face 436 contacts the lateral guide surface 422 further urging the pawl mechanism 408 away from the teeth 404. The lateral guide surface 422 then moves past the chamfered face 436 and contacts the outer face 438. Engagement of the lateral guide surface 422 with the outer face 438 prevents the pawl mechanism 408 from moving laterally toward the teeth 404 until the rotatable body 402 has returned to the initial position (FIG. 4A).

Once the pawl mechanism 408 reaches the initial position (FIG. 4A), the pawl mechanism 408 is moved laterally towards the teeth 404 and the pawl 412 is rotated vertically until it engages one of the teeth 404 to prevent movement of the rotatable body in the first direction 442a. In one embodiment, a biasing member biases the pawl mechanism 408 laterally towards the teeth 404. In another embodiment, the cam mechanism 406 urges the pawl mechanism 408 laterally towards the teeth 404.

In some aspects, the teeth 404 may be configured to move relative to the cam mechanism 406. Moving the teeth 404 relative to the cam mechanism 406 would increase or decrease distance of rotation from the initial position to the fourth position. For example, movement of the cam mechanism 406 in the first direction 442a relative to the teeth 404 will increase the angular rotation of the rotatable body 402 between the first position and the fourth position. Likewise, movement of the cam mechanism 406 in the second direction 442b will decrease the angular rotation of the rotatable body 402 between the first position and the fourth position. The positioning of the cam mechanism 406 relative to the teeth 404 may be selected by a variety of methods including player selection. In one nonlimiting example, reaching the fourth position spins a plurality of reels. Players may want to increase the distance of rotation if, for example, they feel it will increase their luck by increasing the power of their spin. Other players may want to decrease the distance of rotation if, for example, it is difficult and/or uncomfortable to exert the force required to reach the original fourth position.

Movement of the cam mechanism 406 relative to the teeth 404 can be accomplished, for example, by the rotatable body 402 including two independently-rotatable sub-parts formed by a division perpendicular to the shaft 410. The first sub-part would include the teeth 404 and the second sub-part would include the cam mechanism 406. Different shapes, features, and interactions may be used in accord with the present concepts.

In some aspects, the rotary actuator may include a selectively actuatable locking device. The selectively actuatable locking device may be configured to selectively prevent movement of the rotatable body in at least the second direction 442b. This can be accomplished, for example, using a device to selectively prevent the pawl mechanism 408 from moving vertically away from the teeth 404. Additionally or alternatively, the selectively actuatable locking device may engage the rotatable body 402 to prevent movement in at least the second direction using, for example, friction. Additionally or alternatively, the selectively actuatable locking device may prevent the shaft 410 from rotating if the shaft 410 rotates with the rotatable body 402.

Figure 5A:
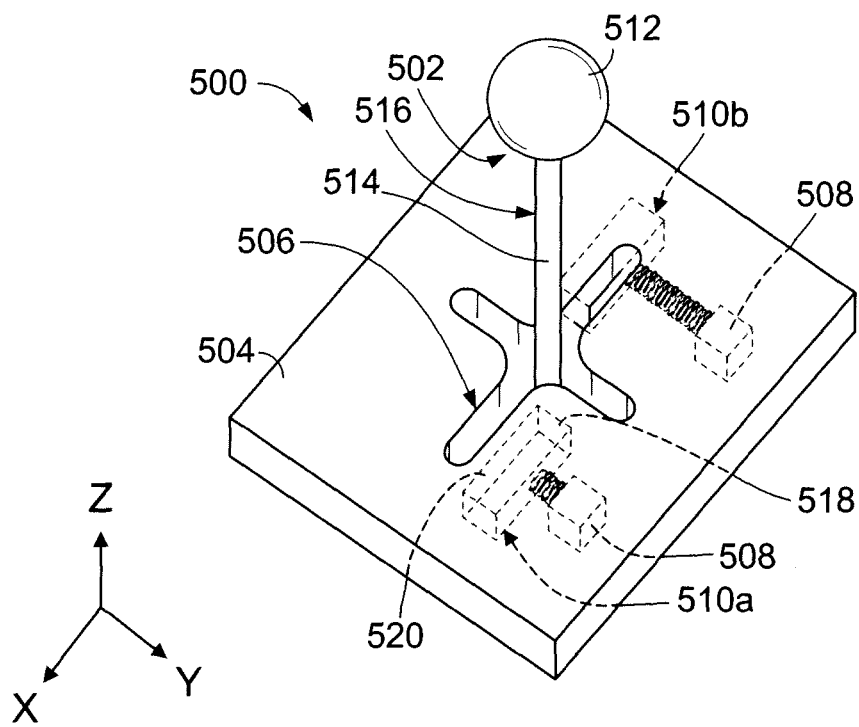
FIG. 5A is a perspective view of a dynamically reconfigurable joystick assembly for limiting lateral movement according to an embodiment.

Referring now to FIG. 5A, a dynamically reconfigurable joystick assembly 500 for limiting movement along the x-axis is shown according to one embodiment. The joystick assembly 500 includes a joystick 502, an upper plate 504 defining an opening 506, and two actuators 508, each having an actuating member 510. The joystick 502 includes a handle 512 and a shaft 514 having a first portion 516 and a second portion (not shown).

The upper plate 504 is disposed below the first portion 516 of the shaft and above the second portion of the shaft. The joystick 502 is disposed within the opening 506 of the upper plate 504 and may be within the opening 506. The opening 506 includes at least two substantially perpendicular slots, allowing the joystick 502 to move within the slots. In the example shown in FIG. 5A, the slots are shown to be defined along the x-axis and y-axis. In some aspects, the upper plate 504 may define an opening 506 having a different shape or extent(s) to allow different ranges of movement.

The actuators 508 and the actuating members 510 are disposed below the upper plate 504. The actuator 508 may be, for example, a solenoid, a linear motor, a motor and drive screw, etc. The actuator 508 is configured to move the actuating member 510 from a first state (e.g., a first position) to a second state (e.g., a second position). The first state is a position where the actuating member 510 does not interfere with travel of the joystick 502 through the opening 506 and the second state is a position where the actuating member 510 inhibits travel of the joystick 502 into at least a portion of the opening 506. As shown in FIG. 5A, the first actuating member 510a is in the first state and the second actuating member 510b is in the second state.

The actuating member 510, in one aspect, is a generally rectangular solid including a blocking face 518 and a leading face 520. The blocking face 518 is oriented such that movement of the joystick 502 in the opening 506 is inhibited by contact with the blocking face 518. The leading face 520 of the actuating member 510 is oriented such that contact between the leading face 520 and the joystick 502 prevents the actuating member 510 from moving toward the second state. In some aspects the actuating member 510 may include different features such as a stepped face having a plurality of blocking faces 518 and a plurality of leading faces 520. As will be described in more detail with reference to FIG. 5B, the stepped face allows the actuating member 510 to progressively inhibit movement of the joystick 502. Additionally, in some aspects, the actuating member 510 may include a sloped face. The sloped face allows the actuating member 510 to selectably inhibit movement of the joystick 502 in the opening 506. Additionally, the sloped face allows the actuating member 510 to guide the joystick into the allowed range of movement if the joystick is not disposed within that range.

In a first game mode, the first and the second actuating members 510 are disposed in the first state and the joystick 502 is allowed to move through the opening 506 uninhibited. In a second game mode, the second actuator 508 moves the second actuating member 510b from the first state to the second state. When the second actuator 510b is in the second state the second state, movement of the joystick 502 in the negative x-direction is inhibited by the blocking face 518 of the second actuating member 510b. However, the joystick 502 may still freely move along the y-axis and in the positive x-direction. In a third game mode, the second actuating member 510b remains in the second state and the first actuator 508 moves the first actuating member 510a into the second state. In this game mode, the joystick 502 is inhibited from moving along the x-axis and may only laterally move along the y-axis. Additionally, a spring is included between each actuator 508 and actuating member 510. If the joystick 502 contacts the leading face 520 and prevents the actuating member 510 from moving completely into the second state, the spring biases the actuating member 510 into the second state when the joystick 502 no longer contacts the leading face 520.

Figure 5B:
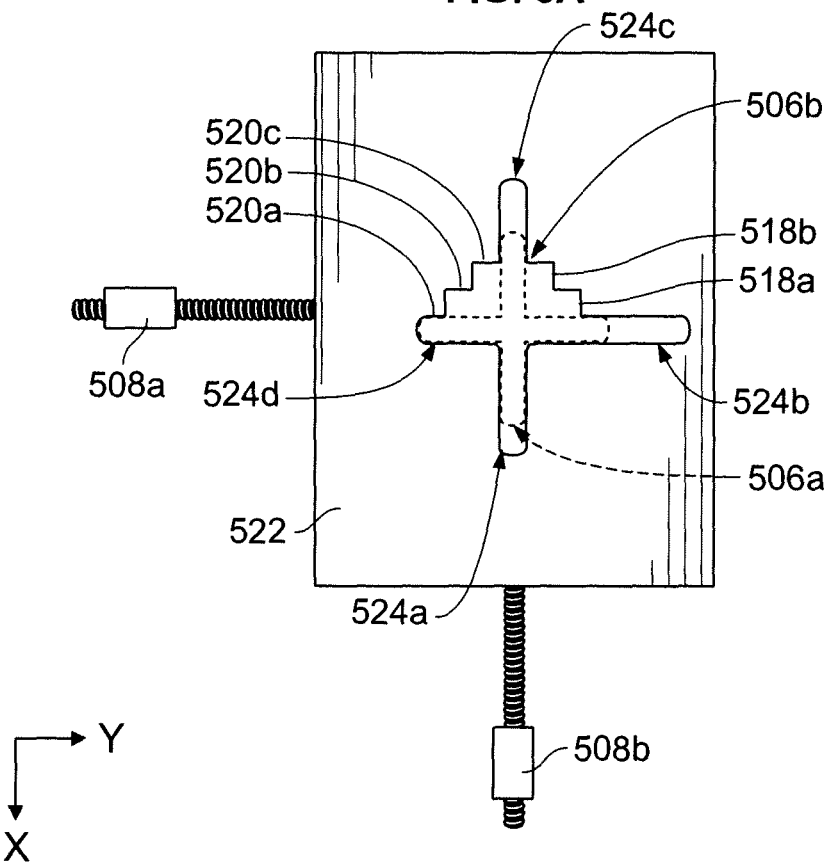
FIG. 5B is a top view of a lower plate for a dynamically reconfigurable joystick assembly for limiting lateral movement according to another embodiment.

Referring now to FIG. 5B, a lower plate 522 of a dynamically reconfigurable joystick assembly for limiting lateral movement is shown according to one embodiment. The lower plate 522 is disposed below the upper plate (not shown) of the joystick assembly. The lower plate 522 may be used in place of or in addition to actuators 508 and actuating members 510. The lower plate 522 is operatively connected to a first actuator 508a and a second actuator 508b, and defines a lower opening 506b. The lower opening 506b includes features that allow the lower plate to inhibit lateral movement of the joystick 502 in at least a portion of the upper opening 506a when the lower plate 522 is moved relative to the upper plate 504.

The actuators 508a,b are configured to translate the lower plate 522 in the x-y plane. The first actuator 508a is movably mounted to translate along the x-axis as the lower plate 522 translates along the x-axis. The second actuator 508b is movably mounted to translate along the y-axis as the lower plate 522 translates along the y-axis.

In the illustrated embodiment, the upper opening 506a in the upper plate 504 is a generally x-shaped. The lower opening 506b is an irregular shape and includes several features to selectively inhibit movement of the joystick in the upper opening 506a when the lower plate 522 is moved laterally. The second opening 506b includes four legs 524a-d of various lengths and a stepped region having blocking faces 518a,b and leading faces 520a-c. In this illustration, both the blocking faces 518a,b and the leading faces 520a-c have a length of one unit where one unit could comprise any desired dimension (e.g., 0.25 inches, 0.50 inches, etc.). In some aspects, the length and/or width of individual faces, legs, and other features may be altered to achieve different results. It is also contemplated that the upper opening 506a and the lower opening 506b may be include different features and patterns to allow different ranges of movement and inhibiting features.

When the lower plate 522 is at an initial position, the first opening 506a in the upper plate 504 and the second opening 506b in the lower plate 522 are aligned so that the joystick 502 can move through the first opening 506a and second opening 506b uninhibited. In a second position, the second actuator 508b moves the lower plate 522 a distance of one unit in the positive x-direction (downward on FIG. 5B). In this position, the joystick 502 may freely travel along the x-axis, but travel along the y-axis is inhibited by the first blocking face 518a. The travel along the y-axis is decreased by a distance of one unit in both directions. In a third position, the second actuator 508b moves the lower plate 522 an additional distance of one unit in the positive x-direction. In this position, the joystick 502 may freely travel along the x-axis, but travel along the y-axis is further inhibited when joystick 502 contacts the second blocking face 518b. In the third position, travel along the y-axis has been limited by two units in each direction. In a fourth position, the second actuator 508b moves the lower plate 522 an additional distance of one unit in the positive x-direction. In this position, the joystick 502 may freely travel along the x-axis, but may no longer travel along the y-axis. The length of the third leg 524c is sufficiently long to allow the joystick to move uninhibited in the negative x-direction while the lower plate is disposed in the fourth position.

Alternatively, travel along the y-axis may be completely inhibited when the lower plate 522 is in a fifth position. In the fifth position, the lower plate 522 is moved a distance of one unit in the negative x-direction from the initial position. In this position, the joystick 502 may freely travel along the x-axis, but may not travel along the y-axis. The length of the first leg 524a is sufficiently long to allow the joystick 502 to move uninhibited through the first opening 506a in the positive x-direction.

Additionally, travel of the joystick along the x-axis may be inhibited by translating the lower plate 522 along the y-axis. In a sixth position, the first actuator 508a translates the lower plate 522 a distance of three units in the positive y-direction from the initial position. In this position, travel of the joystick 502 along the x-axis is inhibited by the second opening, but travel of the joystick 502 along the y-axis is not inhibited. The length of the second leg 524b is sufficiently long to allow the joystick to move uninhibited in the positive y-direction.

Figure 5C:
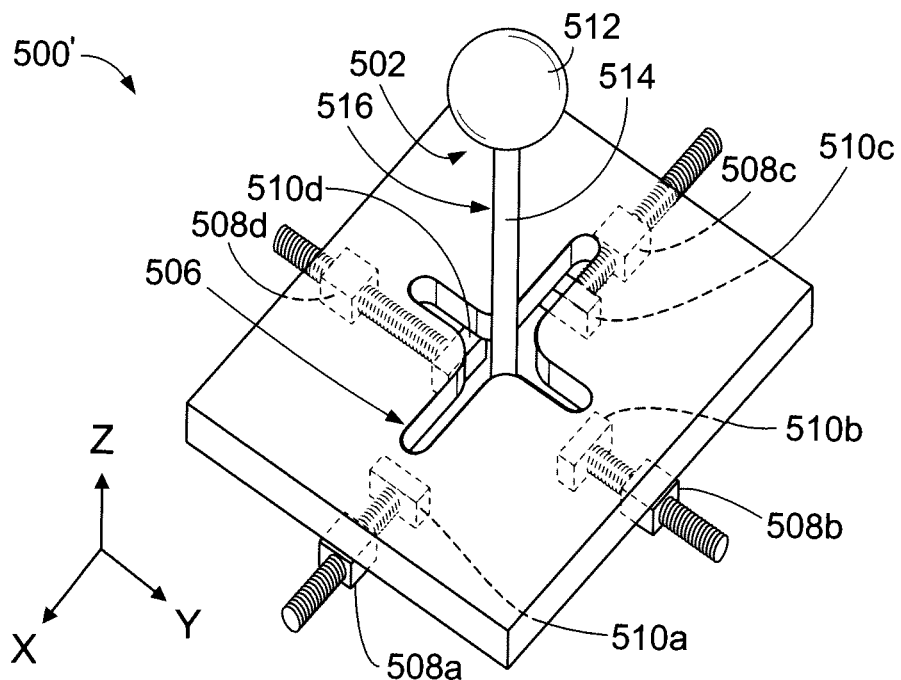
FIG. 5C is a perspective view of a dynamically reconfigurable joystick assembly for limiting lateral movement according to yet another embodiment.

Referring now to FIG. 5C, a dynamically reconfigurable joystick assembly 500' for limiting lateral movement of the joystick 502 is shown according to yet another embodiment. Joystick assembly 500' includes a joystick 502, an upper plate 504 having an opening 506, and four actuators 508a-d. Each of the actuators 508a-d is operatively attached to a respective actuating member 510a-d. The joystick 502 includes a handle 512 and a shaft 514 having an upper, first portion 516 and a lower, second portion (not shown).

The upper plate 504 is disposed below the first portion 516 of the shaft 514 and above the second portion of the shaft. The joystick 502 is disposed within the opening 506 of the upper plate 504 and may be moved vertically or laterally through the opening 506. The opening 506 is x-shaped in the depicted embodiment, allowing the joystick 502 to move along the x- and y-axes. The opening 506 may be different shapes and allow different ranges of movement.

Each of the actuators 508a-d and actuating members 510a-d are aligned with a respective leg of the opening 506. The actuators 508a-d are configured to move the actuating members 510a-d linearly between an initial position and a final position. The illustrated actuators 508a-d of FIG. 5C have a motor and screw configuration and, thus, can selectively move the actuating members 510a-d to any position between the initial position and final position.

The first actuator 508a and actuating member 510a are aligned with the x-axis and selectively inhibit movement of the joystick 502 in the positive x-direction. The second actuator 508b and actuating member 510b are aligned with the y-axis and selectively inhibit movement of the joystick in the positive y-direction. The third actuator 508c and actuating member 510c are aligned with the x-axis and selectively inhibit movement of the joystick 502 in the negative x-direction. The fourth actuator 508d and actuating member 510d are aligned with the y-axis and selectively inhibit movement of the joystick 502 in the negative y-direction.

In the illustrated example, the first and the second actuating members 510a,b are in the initial position and do not inhibit movement of the joystick in the opening 506. The fourth actuating member 510d is in the final position. When the fourth actuating member is in the final position, movement of the joystick 502 in the negative y-direction is completely inhibited. The third actuating member is selectively positioned between the initial position and the final position. In this position, the joystick may travel in the negative x-direction, but may not travel to the full extent of the opening 506. In some aspects, other types of actuators, or combinations thereof, may be used.

Figure 6:
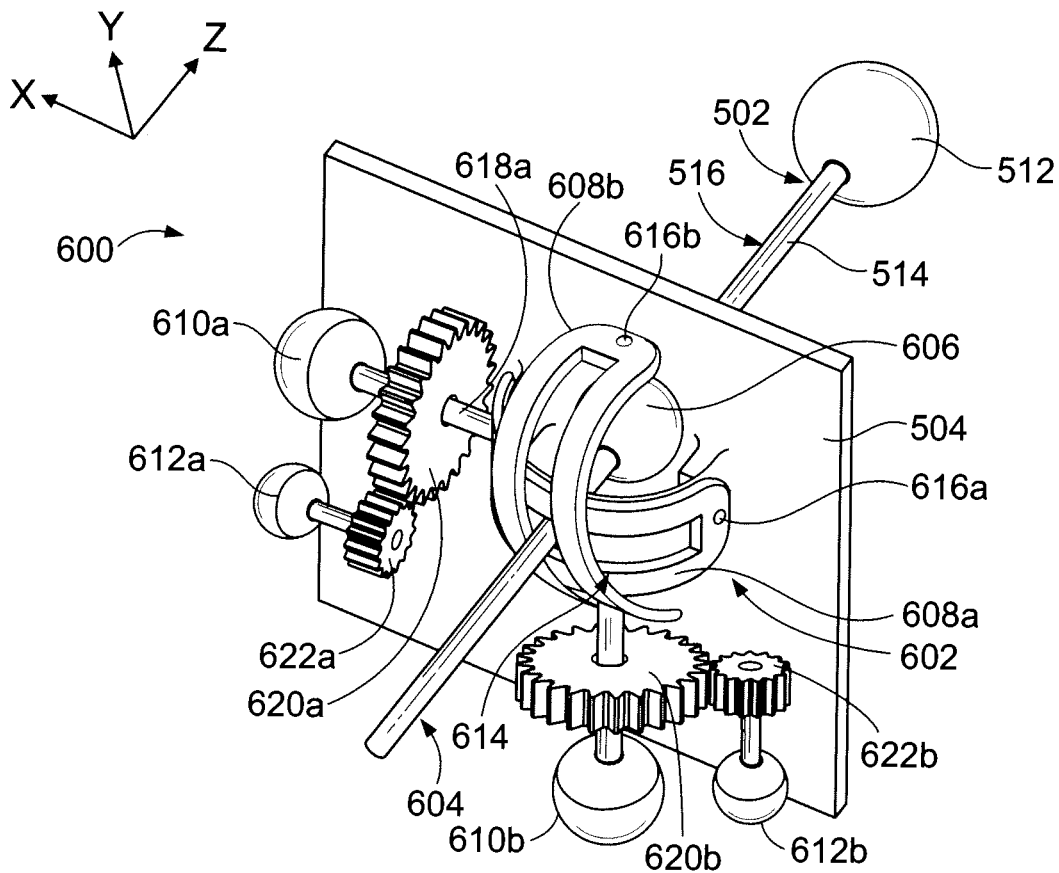
FIG. 6 is a reverse perspective view of a dynamically reconfigurable joystick assembly for restricting movement according to an embodiment.

Referring now to FIG. 6, a dynamically reconfigurable joystick assembly 600 for restricting movement is shown according to one embodiment of the present concepts. The joystick assembly 600 includes a joystick 502, an upper plate 504, and a restricting mechanism 602. The joystick includes a handle 512 and a shaft 514 having a first portion 516 and a second portion 604. The upper plate 504 is disposed below the first portion 516 and above the second portion 604. The joystick 502 is mounted to the upper plate 504 using a captured ball mechanism 606. The captured ball mechanism 606 allows the joystick 502 to move through 360 degrees of rotation.

The restricting mechanism 602 includes arches 608, position sensors 610, and motors 612. Each arch 608a,b includes a slot 614 and a pivot 616a,b. The shaft 514 passes through each slot 614. The slots 614 allow the shaft 512 to travel in a first direction 442a (e.g., the x-direction), but are only nominally larger than the shaft 514 in a perpendicular, second direction 442b (e.g., the y-direction). Each arch 608a,b rotates about the pivot 616a,b, respectively. The pivot 616 is aligned with the captured ball mechanism 606 such that movement of the joystick 502 in the y-dimension causes the first arch 608a to rotate about its pivot 616a and movement of the joystick 502 in the x-direction causes the second arch 608b to rotate about its pivot 616b.

The first position sensor 610a is operatively connected to the first arch 608a via the first arch shaft 618a. The first arch shaft 618a rotates with the first arch 608a such that the first position sensor 610a can detect the absolute position of the first arch 608a in the y-direction. This can be accomplished through, for example, fine angular displacement detection of the first arch 608a. The first arch shaft 618a is connected to a first arch gear 620a such that rotation of the first arch shaft 618a rotates the first arch gear 620a. Teeth of the first arch gear 620a interlock with teeth of a first motor gear 622a such that rotation of the first arch gear 620a results in rotation of the first motor gear 622a. The first motor gear 622a is operatively connected to the first motor 612a. The first arch gear 620a and first motor gear 622a can be sized to adjust the amount of torque transferred between the first arch 608a and the first motor 612a.

Similarly, the second position sensor 610b is operatively connected to the second arch 608b via the second arch shaft 618b. The second arch shaft 618b rotates with the second arch 608b such that the second position sensor 610b can detect the absolute position of the second arch 608b in the x-direction. The second arch shaft 618b is connected to a second arch gear 620b such that rotation of the second arch shaft 618b rotates the second arch gear 620b. Teeth of the second arch gear 620b interlock with teeth of a second motor gear 622b such that rotation of the second arch gear 620b results in rotation of the second motor gear 622b. The second motor gear 622b is operatively connected to the second motor 612b. The second arch gear 620b and second motor gear 622b can be sized to adjust the amount of torque transferred between the second arch 608b and the second motor 612b. In some aspects, the gears may be omitted and the motor may directly drive the arch. It is further contemplated that the motor and positioning senor may share a shaft.

The first motor 612a can be used to control the position of the joystick 502 in the y-direction. The second motor 612b can be used to control the position of the joystick 502 in the x-direction. The first and the second motors 612a,b can be used to select a home position of the joystick 502. For the purposes of the present description, the home position is the location that the joystick 502 returns to when no external force is exerted on the system. By way of nonlimiting example, the joystick 502 is perpendicular to the upper plate 504 in a first home position. A user moves the handle 512 away from the first home position only in the positive x-direction. This causes the second portion 604 to move in the negative x-direction. The first arch 508a does not pivot because its slot 614 is aligned with the x-axis. The second arch 508b does begin to pivot in the negative x-direction. This pivot is detected by the second position sensor 610b. The second motor 612b then applies a torque to the second motor gear 622b. The second motor gear 622b engages the second arch gear 620b, which rotates the second arch shaft 618b. The second arch shaft 618b biases the second arch in the positive x-direction. When the user releases the handle 512, the second motor 612b continues to apply the force until the second position sensor 610b detects that the second arch 608b is aligned with the home position. The restricting mechanism 602 behaves similarly when the first arch 608a is deflected in the y-direction. In some aspects, other devices may be used to control the home position, move the joystick to the home position, or assist in moving the joystick to the home position. These devices can include, for example, springs, elastic bands, biasing members, resilient members, etc. These devices may be used on the joystick, or may be used to rotatably bias the arches 608a,b.

The force applied by the first and the second motors 612a,b may be a constant, a function of deflection, a function of acceleration, a step function, any combination thereof, etc. An example of the exerted force being a constant force is the second motor 612b biasing the second arch 608b toward the home position by applying a constant force throughout the pivot of the second arch 608b. In this example, the user would feel a constant resistance no matter how far the joystick 502 is deflected from the home position in the x-direction. An example of the exerted force being a function of deflection is the first motor 612a biasing the first arch 608a toward the home position by applying a force that increases as the deflection of the first arch 608a increases. Thus, for example, the user would find it twice as difficult to move the joystick 502 when deflected 20° as it was when deflected 10°. An example of the exerted force being a function of acceleration is the second motor 612b biasing the second arch 608b toward the home position by applying a force that increases as the acceleration of the second arch 608b increases. Thus, for example, a user may encounter very little resistance when moving the joystick 502 slowly in the x-direction, but may encounter much greater resistance when attempting to move the joystick 502 rapidly in the x-direction. An example of the exerted force being a step function is the first motor 612a biasing the first arch 608a toward the home position by applying a force that is dependent upon ranges of deflection. Thus, for example, a user may encounter a force when the joystick 502 is deflected between 0° and 10° in the y-direction, twice the force when the joystick is deflected between 10° and 20°, and three times that force when the joystick is deflected between 20° and 30°.

The position of the joystick may be detected using a variety of methods and devices. For example, the position can be dynamically sensed or absolutely sensed. Absolute sensing detects the absolute location of the joystick regardless of an initial or a previous location. Dynamic sensing detects the location of the joystick relative to an initial or a previous location of the joystick and, therefore, should be calibrated. Calibration can occur, for example, by setting a known position of the joystick or known range of movement of the joystick. Setting the known position can be accomplished, for example, by prompting a user to hold the joystick at a set-point such as dead-center. The location of the joystick is then determined by sensing movements from the set-point. Setting the range of motion can be accomplished, for example, by having either a user or actuators move the joystick from a first known point to a second known point.

The restricting mechanism 604 may also be used to selectively restrict movement of the joystick 502. In one nonlimiting example, the first motor 612a prevents the first arch 608a from being deflected past a predetermined point. This can be accomplished by, for example, applying a biasing force that rapidly increases in strength until the first arch 608a returns to the allowed area of travel. It can also be accomplished by, for example, locking the motor from rotation in a direction when the first positioning sensor 610a detects the first arch 608a is at the predetermined point.

Additionally, the restricting mechanism 604 can be used to provide force feedback. Force feedback is applied by the first and the second motors 612a,b biasing the first and the second arches 608a,b, respectively, in response to an occurrence in a game. By way of nonlimiting example, a user may play a fishing game where the first motor 612*a* locks the first arch in a position such that the joystick 502 may only travel along the x-axis. In this example, the player may catch a fish and reel it in using the joystick. If the player catches a small fish, the second motor 612*b* applies short and light biasing forces to the joystick 502 to simulate a small fish on the hook. If the player catches a big fish, the second motor 612*b* applies a different biasing force that may be larger and/or longer in duration. Additionally, the second motor 612*b* can apply no biasing force at all to simulate the fish breaking the fishing line. The force feedback and/or haptic response increases a player's excitement because it makes the game seem more realistic and, therefore, more exciting.

Similarly, other devices may be simulated using the restricting mechanism 602. For example, a slot machine pull arm may be simulated using algorithms applied to the first and the second motors 612*a,b*. In this example, the first motor 612*a* would prevent the first arch 608*a* from moving such that the joystick 502 may only travel along the x-axis. The second motor 612*a* would then apply a biasing force to the second arch 608*b* such that the handle 512 travels to a pull-arm home position located at, for example, the furthest travel of the joystick in the negative x-direction. The player then pulls the handle 512 in the positive x-direction. To simulate a pawl engaging teeth, the second motor 612*b* applies short, light biasing forces at predetermined positions along the x-axis. Once a predetermined position is reached, that position is set to the temporary home position and movement of the joystick 502 in the negative x-direction past that predetermined position is prohibited. Additionally, the second motor 612*b* applies increasing resistance against movement in the positive x-direction as the joystick 502 travels to simulate a spring that is increasing in tension. Once the joystick 502 reaches the final pull arm position, the second motor 612*b* applies a biasing force to bias the joystick 502 back to the pull-arm home position. Other devices may be simulated in accord with the present concepts. It is further contemplated that sounds may accompany the simulation to increase realism.

Figure 7:
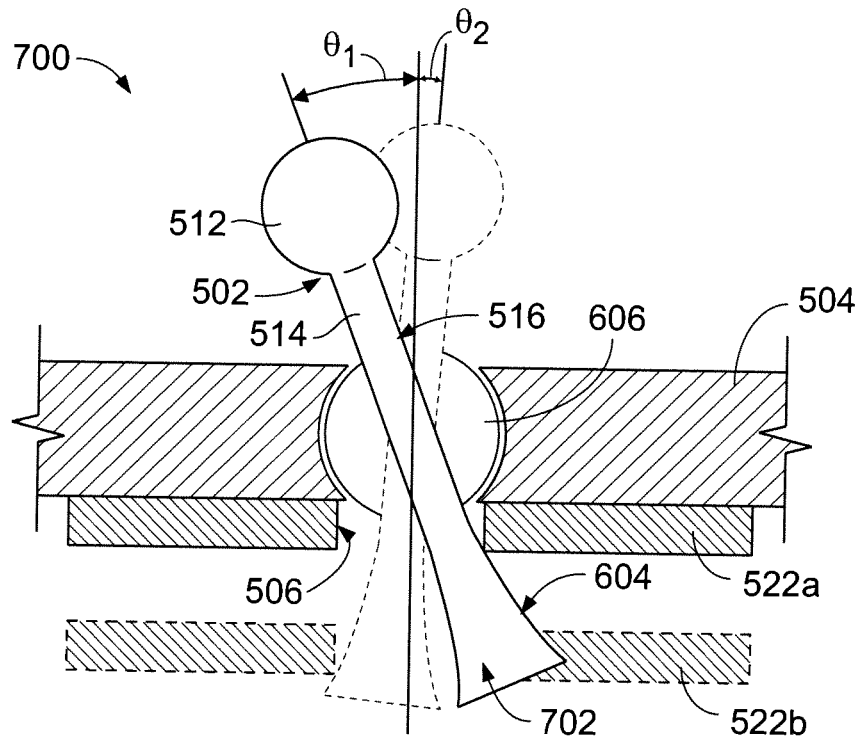
FIG. 7 is a cross-sectional view of a dynamically reconfigurable joystick assembly for restricting movement according to an embodiment.

Referring now to FIG. 7, a dynamically reconfigurable joystick assembly 700 for restricting movement is shown according to an embodiment. The joystick assembly 700 includes a joystick 502, an upper plate 504, and a lower plate 522. The joystick 502 includes a handle 512 and a shaft 514 having a first portion 516 and a second portion 604. The second portion 604 includes a flared feature 702. The upper plate 504 is disposed below the first portion 516 and above the second portion 604. The joystick 502 is mounted to the upper plate 504 using a captured ball mechanism 606. The captured ball mechanism 606 allows the joystick 502 to move through 360 degrees of rotation. The lower plate has an opening 506 with the shaft 514 passing therethrough.

The lower plate 522 is positioned below the upper plate 504 and has a first position 522*a* and a second position 522*b*. When the lower plate 522 is in the first position 522*a*, the joystick may move freely until the shaft 514 engages the lower plate 522*a*, allowing the joystick to travel a distance of $\theta_1$ from center. The lower plate 522 is then moved away from the upper plate 504 to a second position 522*b*. In this position, the joystick 502 moves freely until the shaft 514 engages the lower plate 522*b*. This engagement occurs at a smaller distance $\theta_2$ from center than the original engagement $\theta_2$. Thus, the further the lower plate 522 is from the upper plate 504, the smaller the distance of uninhibited travel. The flared feature 702 is used to more rapidly restrict movement as the lower plate 522 is moved away from the upper plate 504. In other aspects, the flared portion may be omitted. It is further contemplated that additional or alternative features may be included.

Figure 8A:
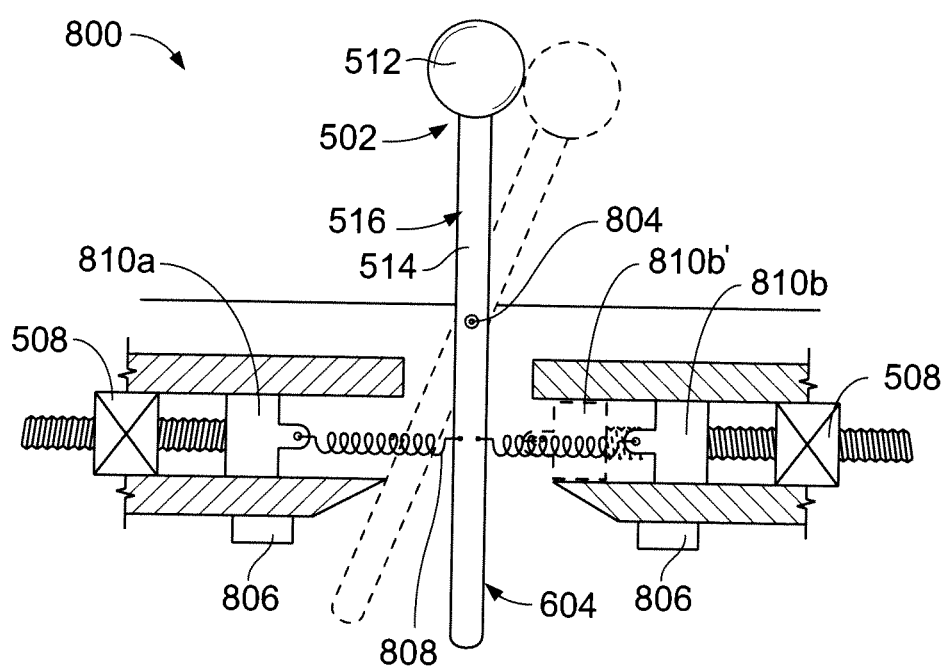
FIG. 8A is a cross-sectional view of a joystick assembly having an alterable home position according to an embodiment.

Referring now to FIG. 8A, a joystick assembly 800 having an alterable home position is shown according to an embodiment. The joystick assembly 800 includes a joystick 502, actuators 508, positioning mechanisms 810*a,b*, and position sensors 806. The joystick 502 includes a handle 512 and a shaft 514 having a first portion 516 and second portion 604. The joystick 502 rotates about a pivot 804 disposed between the first portion 516 and second portion 604. The positioning mechanisms 810*a,b* are disposed on opposing sides of the shaft 514 and are connected to the joystick 502 with springs 508.

In one mode of operation, the joystick 502 is disposed at a first home position when the joystick 502 is vertically positioned. In this example, the second portion 604 of the shaft 514 is disposed at the midpoint of the first positioning mechanism 810*a* and the second positioning mechanism 810*b* because the springs 808 have the same physical properties. In a second mode of operation, the joystick 502 is disposed at a second home position. In the second mode of operation, the rightmost actuator 508 has moved the second positioning mechanism 810*b* to a second position 810*b*'. The second positioning mechanism 810*b* in the second position 810*b*' is to the left of the first position. Thus, the joystick rotates clockwise about the pivot 804 to the second home position. Alternatively, the actuating members 510 may be moved together to adjust the home position of the joystick 502.

Figure 8B:
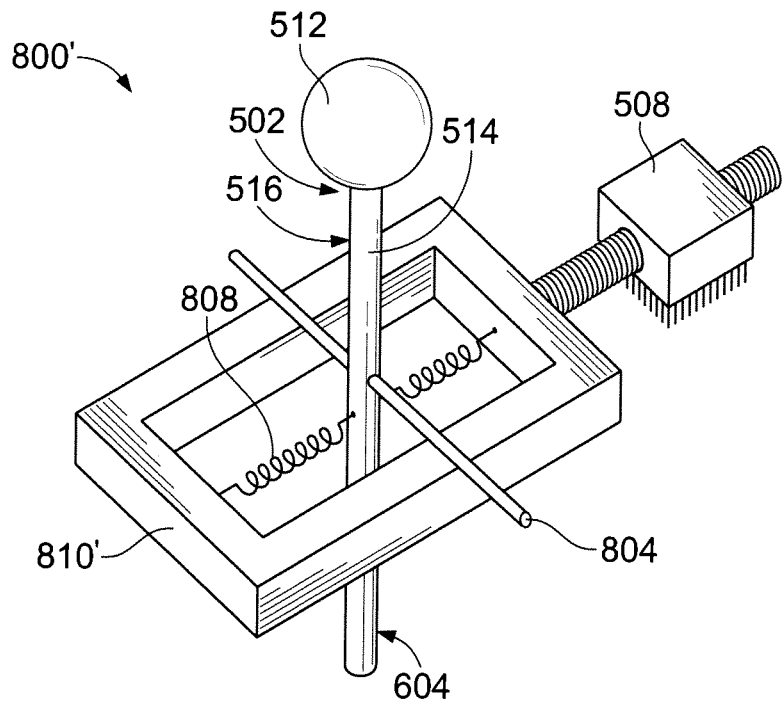
FIG. 8B is a perspective view of the joystick assembly of FIG. 8A according to another embodiment.

Referring now to FIG. 8B, a joystick assembly 800' having an alterable home position is shown according to another embodiment. The joystick assembly 800' includes a joystick 502 actuator 508 and a positioning mechanism 810'. The joystick 502 includes a handle 512 and a shaft 514 having a first portion 516, and a second portion 604. The joystick 502 rotates about a pivot 804 disposed between the first portion 516 and the second portion 604. The positioning mechanism 810' is disposed on opposite sides of the joystick 502 with a spring 508 connecting the opposing sides of the joystick 502 with a side of the positioning mechanism 810'. The actuator 508 is operatively connected to the positioning mechanism 810'. The actuator 508 moves the positioning mechanism 810' such that the joystick 502 rotates about the pivot 804 from a first home position to a second home position in a similar fashion to that illustrated in FIG. 8A.

Additionally, both joystick assemblies 800, 800' can be used for force feedback by moving the actuator(s) 508 during gameplay. Movement of the actuator(s) 508 and the positioning mechanism(s) 810 during gameplay causes the resistance and the forces that a player experiences to change. The gameplay can be, for example, the fishing game discussed above in relation to FIG. 6.

Figure 9A:
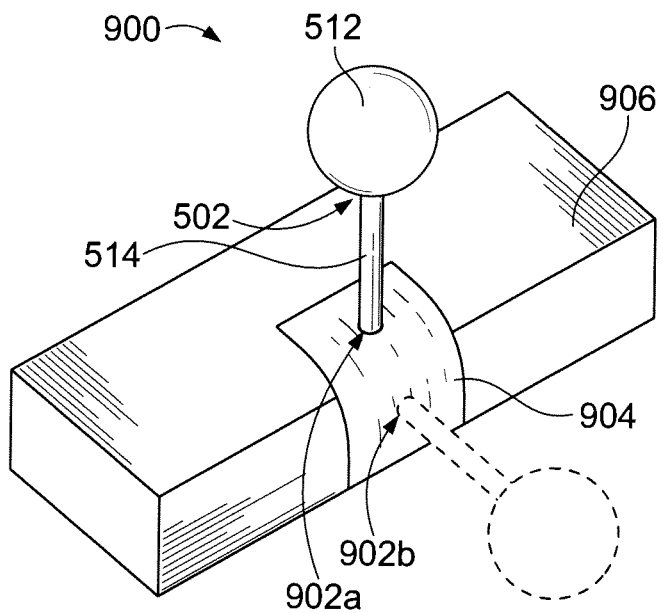
FIG. 9A is a perspective view of a dynamically reconfigurable joystick assembly having a plunger feature according to an embodiment.

Referring now to FIG. 9A, a dynamically reconfigurable joystick assembly 900 having a plunger feature is shown, according to an embodiment. The dynamically reconfigurable joystick assembly 900 includes a joystick having a handle 512 and a shaft 514. The joystick 502 is rotatably mounted to a gaming machine such that the joystick 502 and at least a portion of the joystick assembly can move between a first orientation 902*a* and a second orientation 902*b*. This can be accomplished, for example, using a mechanism with a rotatable surface 904. By way of nonlimiting example, the first orientation 902*a* is substantially perpendicular to the top surface 906 of the deck and the second orientation 902*b* is substantially parallel to the top surface 906. By way of nonlimiting example, the first orientation 902*a* and the second orientation 902b can be from 90° to 110° apart, from 80° to 120° apart, from 60° to 140° apart, or from 40° to 180° apart.

Figure 9B:
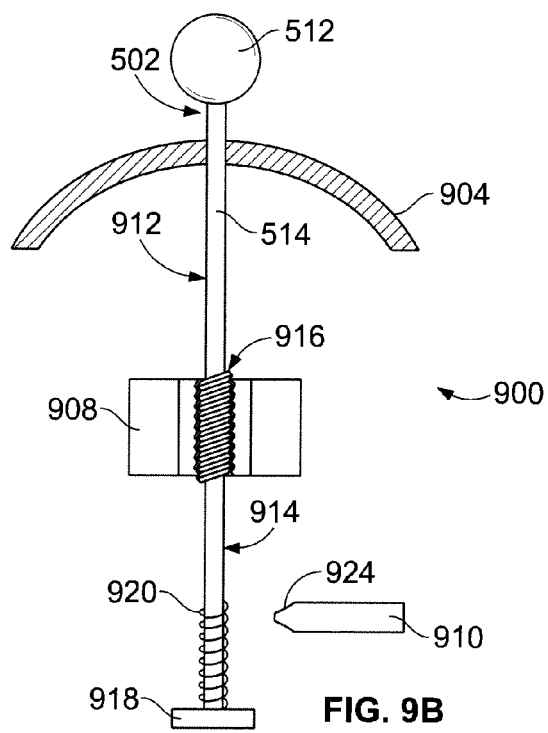
FIG. 9B is a cross-sectional view of the dynamically reconfigurable joystick assembly of FIG. 9A in a first state.
Figure 9B:
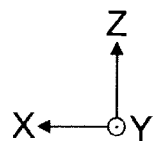
Figure 9C:
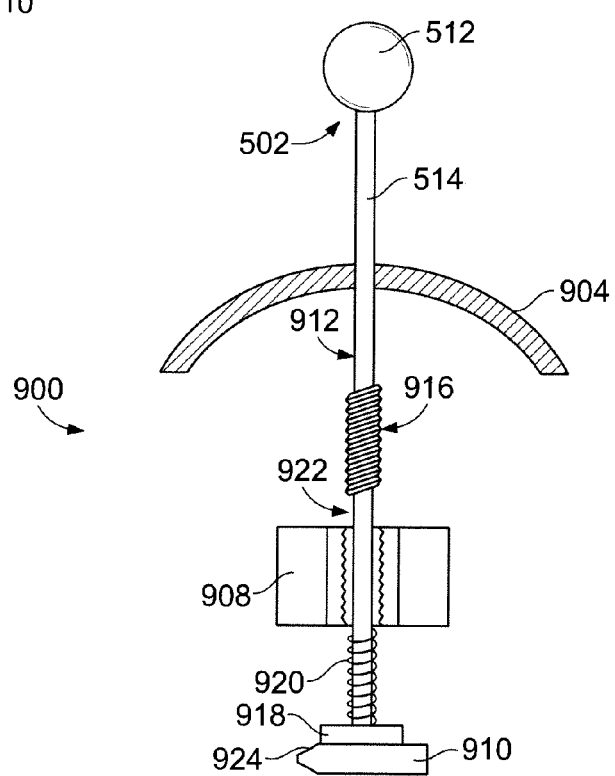
FIG. 9C is a cross-sectional view of the joystick assembly of FIG. 9A in a second state.

Referring now to FIGS. 9B and 9C, the joystick assembly 900 of FIG. 9A is shown in a first and a second state, respectively. The joystick assembly 900 includes a joystick 502, a rotatable surface 904, a motor 908, and a stop member 910. The joystick 502 includes a handle 512 and a shaft 514. The shaft 514 includes an upper portion 912, a lower potion 914, a threaded portion 916, and a foot portion 918. The upper portion 912 is located proximal to the handle 512 and the foot portion 918 is located distal to the handle 512. The lower portion 916 is located proximal to the foot portion 918. The threaded portion 916 is located between the upper portion 912 and the lower portion 914. A spring 920 is coiled about the shaft 514 and is disposed between the threaded portion 916 and the foot portion 918.

FIG. 9B shows the dynamically reconfigurable joystick assembly 900 of FIG. 9A in the first state, according to an embodiment. In the first state, the threaded portion 916 engages the motor 908 such that movement of the joystick 502 in the z-direction is prohibited.

FIG. 9C shows the joystick assembly 900 in the second state, according to an embodiment. In the second state, the threaded portion 916 does not engage the motor 908. Additionally, the stop member 910 engages the foot portion 918 such that a gap 922 is formed between the motor 908 and the threaded portion 916. The gap 922 prevents damage to the motor 908 and the threaded portion 916 when the joystick 502 is used as a plunger mechanism. In the second state, the spring 920 engages both the motor 908 and the foot portion 918 to bias the foot portion 918 away from the motor 908.

When transitioning from the first state to the second state, the motor 908 drives the threaded portion 916 in the positive z-direction and out of engagement with the motor 908. The stop member 910 is then urged in the positive x-direction. This can be accomplished using a variety of actuators such as a solenoid, motor, etc. The stop member 910 includes a chamfered edge 924. The chamfered edge 924 engages the foot portion 918 and urges the joystick 502 in the positive z-direction as the stop member is urged in the positive x-direction. This moves the threaded portion 916 away from the motor 908. When the stop member 910 is urged fully into position, the joystick 502 is in the second state.

When in the second state, a user may move the joystick 502 along the z-axis in the positive z-direction. As a user grasps the handle 512 and pulls the joystick 502 outward, the spring 920 compresses between the motor 908 and the foot portion 918. The threaded portion 916 is located a distance away from the rotatable surface 904 such that the threaded portion 916 will not engage the rotatable surface 904 when the spring 920 is fully compressed. When the user releases the handle 512, the joystick is biased in the negative z-direction by the spring 920. The joystick travels in the negative z-direction until the foot member 918 contacts the stop member 910.

Sensors are included to detect the position, and/or speed of the joystick 502, and/or the impact of the foot portion 918 against the stop member 910. These sensors can be, for example, optical sensors, Hall Effect sensors, pressure sensors, accelerometers, etc. The measured value can then be relayed to the game to create different effects such as, for example, a pinball being launched at different speeds dependent upon the distance the player moved the handle 502 before releasing.

When transitioning from the first state to the second state, the stop member 910 is urged in the negative x-direction. The chamfered edge 924 of the stop member 910 helps to prevent thread damage by guiding the foot portion 918 downward until the threaded portion 916 engages with the motor 908. The threaded portion 916 includes a tapered lead-in portion to prevent cross-threading or other engagement errors. The motor 908 then moves the joystick 502 downward using the threaded portion 916 until the joystick 502 returns to the first state.

Figure 10A:
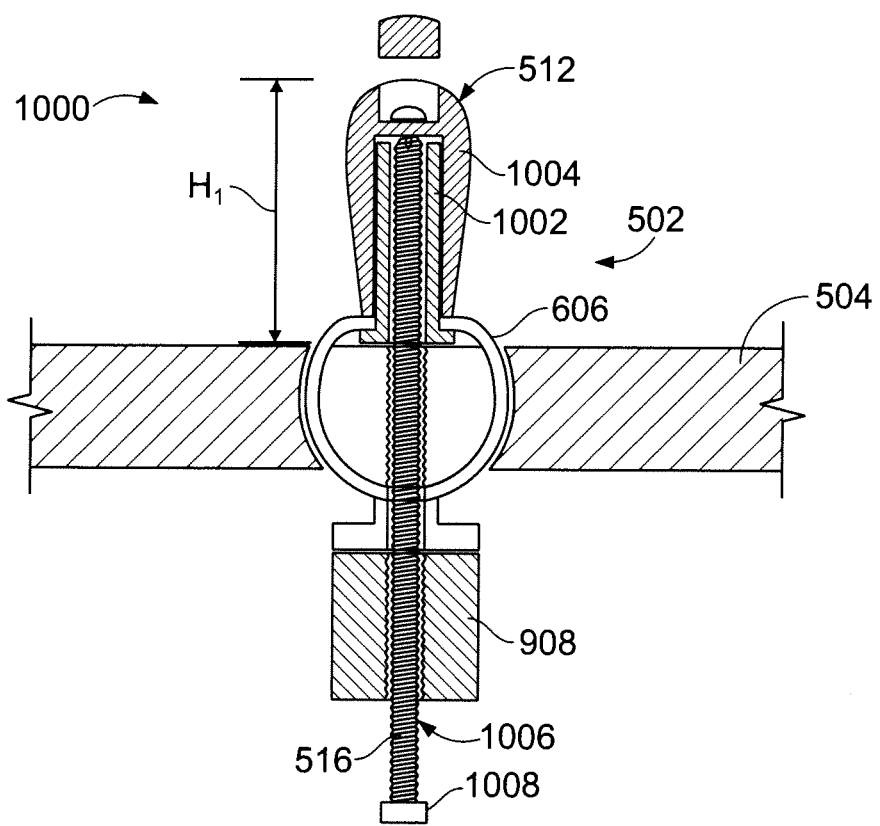
FIG. 10A is a cross-sectional view of a dynamically reconfigurable joystick assembly having a length adjusting feature in a first state according to an embodiment.
Figure 10B:
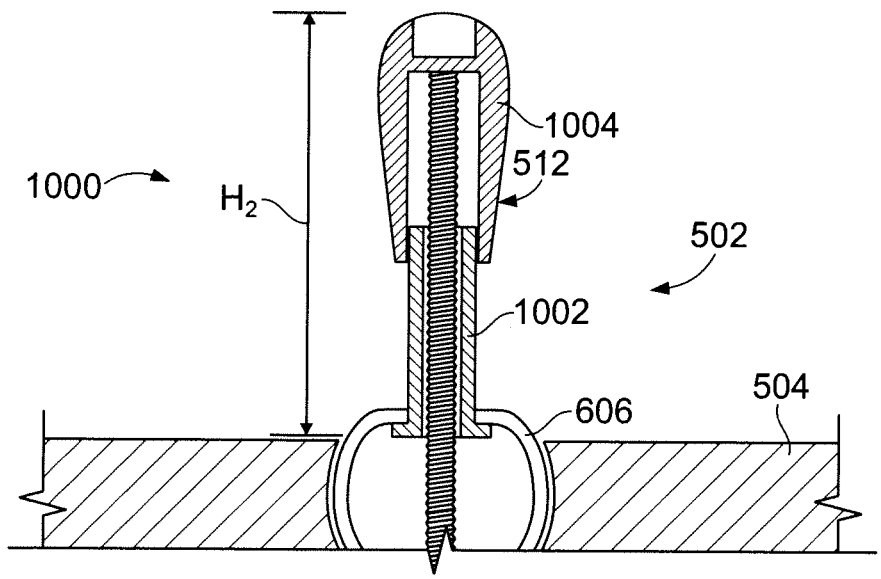
FIG. 10B is a cross-sectional view of the joystick assembly of FIG. 10A in a second state.

Referring now to FIGS. 10A and 10B, a dynamically reconfigurable joystick assembly 1000 having a length adjusting feature according to an embodiment. The joystick assembly 1000 includes a joystick 502, an upper plate 504, and a motor 908. The joystick 502 is mounted to the upper plate 504 using a captured ball mechanism 606. The captured ball mechanism 606 allows the joystick 502 to move through 360 degrees of rotation. The joystick includes a handle 512 and a shaft 514. The handle 502 includes an inner sleeve 1002 that slidably engages an outer sleeve 1004. The shaft 514 includes a threaded portion 1006 and a stop member 1008. The stop member 1008 is disposed distal to the handle 512. The threaded portion 1006 engages the motor 908.

FIG. 10A shows the joystick assembly 1000 in a first state. In the first state, the inner sleeve 1002 is fully disposed within the outer sleeve 1004 and the joystick 502 has a height of $H_1$ from the upper plate 504. FIG. 10B shows the joystick assembly 1000 in a second state. In the second state, the inner sleeve 1002 is only partially disposed within the outer sleeve 1004 and the joystick 502 has a height of $H_2$ from the upper plate 504. As shown, the height $H_2$ of the joystick 502 in the second state is taller than the height $H_1$ of the joystick in the first position.

When transitioning from the first state to the second state, the motor 908 drives the threaded portion 1006 of the shaft 516 upward. The upward motion of the shaft 516 causes the outer sleeve 1004 to slide upward relative to the inner sleeve 1002. This upward motion may be stopped at any time between the first state and the second state. The shaft 516 continues to move upward until the stop member 1008 engages the motor 908. When the stop member 1008 engages the motor 908, the joystick 502 is disposed in the second state, at its maximum height $H_2$. At this height, the outer sleeve 1004 continues to engage the inner sleeve 1002. This helps reduce points at which a user may be pinched by portions of the joystick 502.

When transitioning from the second state to the first state, the motor 908 drives the threaded portion 106 of the shaft 516 downward. The downward motion of the shaft 516 causes the outer sleeve 1004 to slide downward relative to the inner sleeve 1002. This downward motion may be stopped at any time between the second state and the first state. The shaft 516 continues to move downward until the inner sleeve 1002 is fully disposed within the outer sleeve 1004. In this position, the joystick 502 is in the first state and is at its shortest height $H_1$.

In accord with the above concepts, the above described embodiments may also be combined to produce dynamically reconfigurable joystick assemblies. For example a joystick assembly for limiting lateral movement of the joystick may be combined with a rotary actuator. Another example would be a joystick assembly for limiting the lateral movement of the joystick being combined with a reconfigurable home position. Yet another nonlimiting example would be a dynamically reconfigurable joystick assembly having a plunger feature and a reconfigurable home position. These combinations may be produced in series or in parallel. For the purposes of the present specification, "series" is when the concepts are incorporated on a single device (e.g., along the same shaft) and "parallel" is when the concepts are incorporated on different devices (e.g., two shafts connected by a linkage).

One nonlimiting example of the above concepts being combined to act in series includes a joystick assembly with movement limiting features similar to FIG. 5A combined with ratcheting features similar FIG. 4A-4E. One such assembly could include a joystick 502, an upper plate 504 defining an opening 506(FIG. 5), two actuators 508, each having an actuating member 510 (FIG. 5), and a rotary actuator 400 (described in more detail with reference to FIGS. 4A-4E). The joystick includes a handle 512 and a shaft 514 having a first portion 516 and a second portion 604. The second portion 604 is connected to the rotatable body 402 of the rotary actuator 400 (replacing lever-arm 444 in FIG. 4A). The rotary actuator 400 further includes a selectively actuatable locking device to selectively prevent rotation of the rotatable body 402 relative to the pawl mechanism 408. A gimbal may be used to rotatably mount the rotary actuator 400 such that the handle 512 may move along more than one axis.

In one nonlimiting example, the selectively actuatable locking device is engaged to prevent rotation of the rotary actuator 400 in the first joystick state. The shaft 514 may still move through the opening 506 uninhibited. In a second joystick state, the first and the second actuators 508a,b move actuating members 510a,b from a first position to a second position in order to prevent movement of the joystick 502 along a first axis of the opening 506, but movement along a second axis is allowed. In a third joystick state, the actuating members 510a,b remain in the second position and the second position and the selectively actuatable locking device is disengaged. This allows the pawl mechanism 408 to move relative to the rotatable body 402. In the third joystick state, the rotary actuator 400 ratchets the joystick 502 in a first direction as the player moves the joystick 502 along the second axis.

Further, a touchscreen may also be employed with the above concepts. For example, the second portion of the shaft may be fitted with a mechanism including a pad that contacts the touchscreen. The pad includes capacitive/conductive materials so that the touchscreen can detect the pad. Additionally or alternatively, the pad may be any non-abrasive material if the touchscreen is capable of detecting contact with any object (e.g. a pressure-sensitive screen). The mechanism would allow the touchscreen to detect the location of the joystick. The touchscreen is preferably disposed below the joystick assembly.

Additionally, concepts disclosed above allow for a player to configure a gaming machine to their own comfort. For example, a joystick assembly having a reconfigurable length can be adjusted by the player to increase leverage or simply alter the physical feel of the joystick. By way of nonlimiting example, the embodiments disclosed in FIGS. 6 and 8A can be used to adjust the resistance of the joystick.

The concepts of the present disclosure may be implemented at a variety of times. For example, a single type of dynamically of reconfigurable joystick assembly may be installed on two different types of machines. Additionally, a dynamically reconfigurable joystick assembly may change properties of the joystick between two different game themes on the same machine, between different base games played on a machine (e.g. player-selectable games), between a base game and a bonus game, between a base game and a bonus feature, during play of a single game, etc.

One problem that arises with a joystick that is not dynamically reconfigurable is that a player can be easily confused and believe a joystick is broken or malfunctioning. That is, if a player has 360 degrees of freedom, but a bonus game only allows movement along the x-axis to produce a result, the player may not understand why the rest of the degrees of freedom may not produce a result and think that a sensing element is malfunctioning. Even if the player did understand that movement in the x-axis was the only productive motion, the player may still be frustrated when movements are not recorded. Thus, dynamic reconfiguration of the joystick increases player satisfaction in these situations. Of course, appropriate instructions may also be output to the GUI to inform the player of the altered joystick configuration.

One benefit associated with a dynamically reconfigurable joystick assembly is that the cost may be amortized across more of a manufacturer's gaming machines. Additionally, a used gaming machine may have a new theme loaded onto it without additional cost of replacing or removing an input device. Further, a rotary actuator in accord with the present concepts also decreases costs because of its compact size and low-cost features.

An additional benefit of a dynamically reconfigurable joystick assembly is increased player satisfaction through diversity of gameplay within a single gaming session. For example, in one bonus game, the player may have to go fishing. The joystick would be reconfigured to only allow the player to move the joystick forward or backward while reeling in the fish. Further, the joystick could provide force feedback to simulate a fish pulling on the line. In another bonus game, the player may have to walk a tightrope. In this bonus game, the joystick would be reconfigured to only allow the player to move the joystick left to right. Further, force feedback could simulate a redistribution of weight as a character moves further from center. In yet another bonus game, the player may have to fly a plane. In this bonus game, the joystick would be configured to allow 360 degrees of movement. In still yet another bonus game, the player may have to spin reels. In this bonus, the joystick would be reconfigured to simulate a ratcheting pull-arm and allow the player to move the joystick in one dimension.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming machine comprising:
    one or more display devices configured to display first and second wagering game parts;
    a configurable joystick configured to control aspects of the first and second wagering game parts in response to being operated by a player; and
    one or more memory devices storing instructions that, when executed by at least one processor, cause the gaming machine to:
        dispose the joystick in a first joystick state during the first wagering game part, the first joystick state including at least one of a first home position, use of a ratcheting feature, a first predefined range of movement in one or more axes, a first predefined arc of rotation in one or more axes, use of a plunger feature, and a first joystick height setting, and
        responsive to a trigger, dynamically reconfigure the joystick to a second joystick state for use during the second wagering game part.

2. The gaming system of claim 1, wherein the first wagering game part comprises a part of at least one of a base wagering game, a bonus game, or a game feature.

3. The gaming system of claim 1, wherein the second wagering game part comprises a part of at least one of a base wagering game, a bonus game, or a game feature.

4. A gaming system comprising:
one or more display devices configured to display first and second wagering game parts;
a configurable joystick configured to control aspects of the first and second wagering game parts in response to being operated by a player; and
one or more memory devices storing instructions that, when executed by at least one processor, cause the gaming machine to:
dispose the joystick in a first joystick state during the first wagering game part, and
responsive to a trigger, dynamically reconfigure the joystick to a second joystick state for use during the second wagering game part,
wherein, responsive to a second trigger, the instructions cause the gaming machine to dynamically reconfigure the joystick to a third joystick state for use during a third wagering game part.

5. A gaming system comprising:
one or more display devices configured to display first and second wagering game parts;
a configurable joystick configured to control aspects of the first and second wagering game parts in response to being operated by a player; and
one or more memory devices storing instructions that, when executed by at least one processor, cause the gaming machine to:
dispose the joystick in a first joystick state during the first wagering game part, and
responsive to a trigger, dynamically reconfigure the joystick to a second joystick state for use during the second wagering game part,
wherein, responsive to a second trigger, the instructions cause the gaming machine to dynamically reconfigure the joystick to the first joystick state.

6. The gaming system of claim 1, wherein the trigger includes an outcome of a base wagering game.

7. The gaming system of claim 1, wherein the trigger includes a transition of the wagering game from the first wagering game part to the second wagering game part.

8. A method comprising:
receiving an input indicative of a wager;
providing a configurable joystick in a first joystick state, the first joystick state including at least one of a first home position, using a ratcheting feature, a first predefined range of movement in one or more axes, a first predefined arc of rotation in one or more axes, using a plunger feature, and a first joystick height setting;
conducting, by one or more processors, a first wagering game part with the joystick in the first joystick state;
responsive to a trigger, dynamically reconfiguring the joystick from the first joystick state to a second joystick state; and
conducting, by at least one of the one or more processors, a second wagering game part with the joystick in the second joystick state.

9. The method of claim 8, wherein the first wagering game part comprises a part of at least one of a base wagering game, a bonus game, or a game feature.

10. The method of claim 8, wherein the second wagering game part comprises a part of at least one of a base wagering game, a bonus game, or a game feature.

11. A method
receiving an input indicative of a wager;
providing a configurable joystick in a first joystick state;
conducting, by one or more processors, a first wagering game part with the joystick in the first joystick state;
responsive to a trigger, dynamically reconfiguring the joystick from the first joystick state to a second joystick state;
conducting, by at least one of the one or more processors, a second wagering game part with the joystick in the second joystick state; and
responsive to a second trigger, dynamically reconfiguring the joystick to a third joystick state for use during a third wagering game part.

12. A method
receiving an input indicative of a wager;
providing a configurable joystick in a first joystick state;
conducting, by one or more processors, a first wagering game part with the joystick in the first joystick state;
responsive to a trigger, dynamically reconfiguring the joystick from the first joystick state to a second joystick state;
conducting, by at least one of the one or more processors, a second wagering game part with the joystick in the second joystick state; and
responsive to a second trigger, dynamically reconfiguring the joystick to the first joystick state.

13. The method of claim 8, wherein the trigger includes a transition of a wagering game from the first wagering game part to the second wagering game part.

14. The method of claim 8, wherein the trigger includes an outcome of a base wagering game.

15. The method of claim 8, wherein the joystick comprises a shaft and wherein the first joystick state includes positioning the shaft at the first home position and the second joystick state includes positioning the shaft at a second home position.

16. The method of claim 8, wherein the joystick includes the ratcheting feature and wherein the first joystick state includes use of the ratcheting feature and the second joystick state does not include use of the ratcheting feature.

17. The method of claim 8, wherein the joystick comprises a shaft and wherein the first joystick state includes the first predefined arc of rotation of the shaft and the second joystick state includes a second predefined arc of rotation of the shaft, different than the first arc of rotation.

18. The method of claim 8, wherein the joystick comprises a shaft and wherein the first joystick state includes the first predefined range of movement of the shaft and the second joystick state includes a second predefined range of movement of the shaft, different than the first range of movement.

* * * * *